United States Patent [19]

Okuyama

[11] Patent Number: 6,028,985
[45] Date of Patent: *Feb. 22, 2000

[54] OUTPUT METHOD AND APPARATUS

[75] Inventor: Hitoshi Okuyama, Yokohama, Japan

[73] Assignee: Canon Kabushiki Kaisha, Tokyo, Japan

[ * ] Notice: This patent issued on a continued prosecution application filed under 37 CFR 1.53(d), and is subject to the twenty year patent term provisions of 35 U.S.C. 154(a)(2).

[21] Appl. No.: 08/953,972

[22] Filed: Oct. 20, 1997

Related U.S. Application Data

[63] Continuation of application No. 08/230,248, Apr. 20, 1994, abandoned.

[30] Foreign Application Priority Data

Apr. 23, 1993 [JP] Japan .................................. 5-119240

[51] Int. Cl.[7] .......................... G06F 13/18; G06F 13/30
[52] U.S. Cl. ............................ 395/500; 395/115; 711/2; 711/171
[58] Field of Search .................................. 395/500, 115, 395/116, 114, 101; 711/2, 203, 170, 171

[56] References Cited

U.S. PATENT DOCUMENTS

| | | | |
|---|---|---|---|
| 3,699,530 | 10/1972 | Capowski et al. | 340/172.5 |
| 4,426,166 | 1/1984 | Bowling | 400/62 |
| 4,829,445 | 5/1989 | Burney | 364/478 |
| 5,046,039 | 9/1991 | Ugajin et al. | 395/250 |
| 5,179,662 | 1/1993 | Corrigan et al. | 395/250 |
| 5,283,883 | 2/1994 | Mishler | 395/250 |
| 5,544,326 | 8/1996 | Pease et al. | 395/250 |

FOREIGN PATENT DOCUMENTS

| | | | |
|---|---|---|---|
| 0 096 407 A1 | 12/1983 | European Pat. Off. | G06F 3/12 |
| 0432978 | 6/1991 | European Pat. Off. . | |
| 0505764 | 9/1992 | European Pat. Off. . | |
| 63-222544 | 9/1988 | Japan . | |
| WO 9012359 | 10/1990 | WIPO . | |
| WO 91/13407 | 9/1991 | WIPO | G06F 13/18 |

OTHER PUBLICATIONS

European Search Report, dated Apr. 12, 1999, for Appln. No. EP 98 203328.

*Primary Examiner*—Kevin J. Teska
*Assistant Examiner*—Thai Phan
*Attorney, Agent, or Firm*—Fitzpatrick, Cella, Harper & Scinto

[57] ABSTRACT

An output apparatus automatically selects one of a plurality of interfaces and ensures receiving buffers corresponding to the interfaces. Data is taken through each interface into the corresponding receiving buffer and the device is controlled to change sizes of the receiving buffers in accordance with conditions of selection.

66 Claims, 19 Drawing Sheets

ERROR PROCESS

OUTPUT METHOD AND APPARATUS

This application is a continuation of application Ser. No. 08/230,248, filed Apr. 20, 1994, now abandoned.

BACKGROUND OF THE INVENTION

1. Field of the Invention

The present invention relates to an output method or an apparatus which uses an interface such as an RS-232C, SCSI or parallel interface such as that produced by the Centronics company.

2. Description of the Related Art

Recently, some printing devices have been developed which use interfaces and in which the device can change from one interface to another automatically. However, if one interface is selected, these printing devices can only receive data through the selected interface. Accordingly, there has developed a concept in which printing devices receive data simultaneously from several interfaces. However, in such devices, if they have fixed areas of memory corresponding to each interface as a receiving buffer, the total necessary memory area of the printing apparatus becomes a number of times larger than that necessary for devices that receive data through a selected interface. Furthermore, there are some printing devices using several interfaces, which can select the interface through which first data is received. For that reason, if a speed of transferring data through the selected interface is slow, the time necessary for receiving the data is long. Moreover, it is necessary for the device to interpret the received data and therefore, processing the data to be received through the unselected interfaces is still more delayed. Getting back to the device that selects the interface with which the first data is received as stated above. If the processing of the data is interrupted, such as, for example, at the middle of a page to be printed, processing the data to be received by the unselected interface is still more delayed. There are some devices with several interfaces including a two-way interface which can automatically change from one interface to another. But if one interface is selected, these printing devices can get and interpret data only through the selected interface.

So, there has been developed the concept of a printing device that receives data simultaneously through several interfaces. However, the data which can be interpreted is only the data which can be received through the selected interface. Even if host computers are provided to transfer the data to the printing device, the device can not get a status of affairs until the device selects the two-way interface.

In the above-described devices, error recovery is carried out for a selected interface or for all interfaces regardless of the reason for the error.

Furthermore, there are devices which can inform a user that a transmitting error has occurred. However, with such devices the incorrect data is still output after the error has occurred. In addition, there are devices that transfer busy signals and interrupt transferring of data. However, with which such devices after recovering from the error, the device begins to receive middle data.

SUMMARY OF THE INVENTION

The present invention has been made in consideration of the above situations, and has as one of its objects, to provide an output method and apparatus capable of controlling a size of receiving buffers when receiving data through each interface. Another object is to provide an output method and apparatus capable of changing from one interface to another in accordance with the condition of the data being received.

Another object of the present invention is to provide an output method and apparatus capable of assigning an adequate amount of the receiving buffer to each interface by controlling the size of the receiving buffers in accordance with the condition of the selected interfaces.

Another object of the present invention is to provide an output method and apparatus capable of selecting an effective interface for use by changing from one interface to another in accordance with a result of monitoring the condition of the receiving buffers.

Another object of the present invention is to provide an output method and apparatus capable of selecting a usable interface by changing from one interface to another in accordance with the result of detecting the end of data at each interface.

Another object of the present invention is to provide an output method and apparatus capable of informing the condition of each interface by transferring a predetermined status signal through the two-way interface regardless of the condition of the selected interface.

Another object of the present invention is to provide an output method and apparatus capable of limiting the interface to carry out the process of error recovery in accordance with the condition of error occurring while the selection of interface remains the same.

Another object of the present invention is to provide an output method and apparatus capable of restricting useless data processing after a transmitting error has occurred a few times and disregarding the data from the interface relating to the error until a time-out signal has occurred, by monitoring the condition of error occurring.

DETAILED DESCRIPTION OF THE PREFERRED EMBODIMENTS

1st Embodiment

An embodiment according to the present invention will be described with reference to the accompanying drawings.

Figure 1:
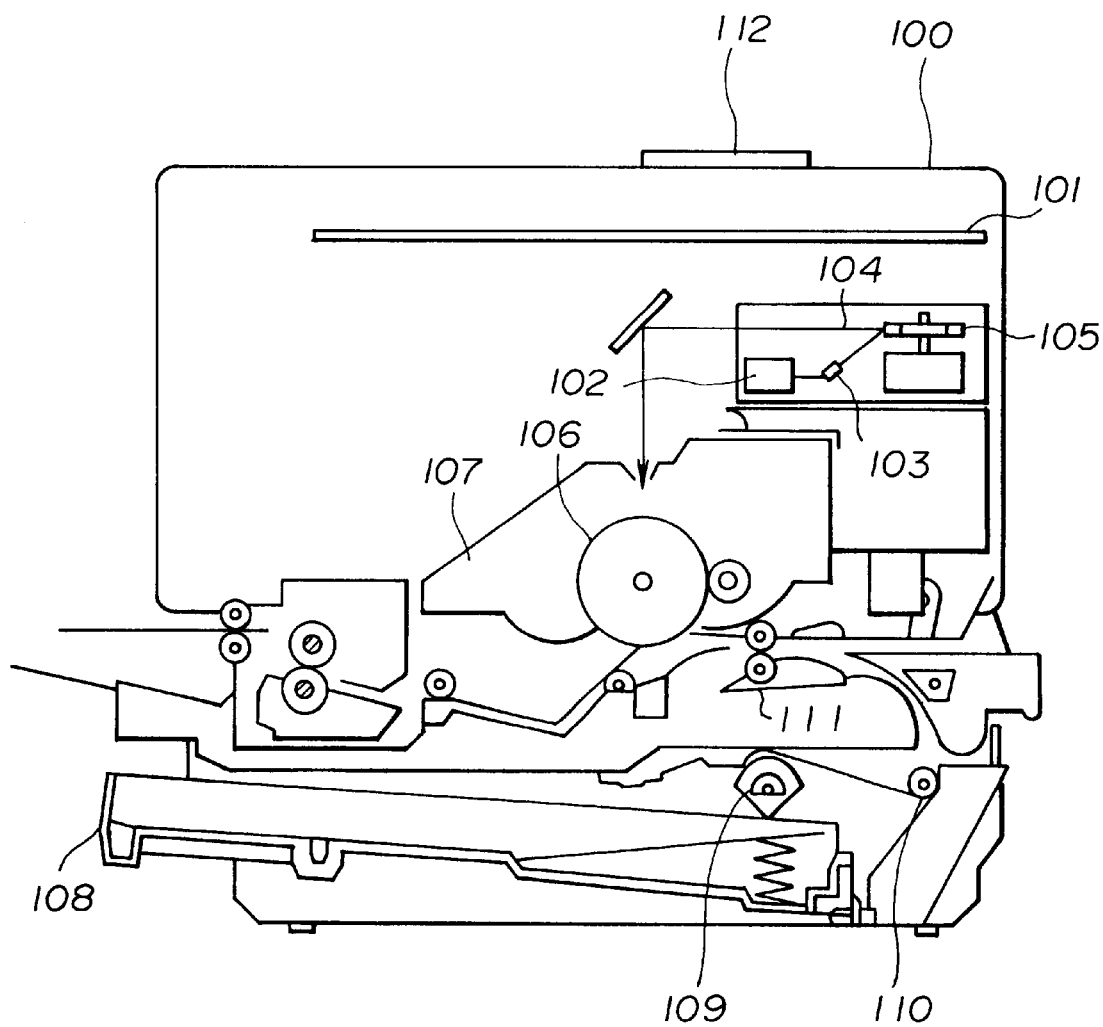
FIG. 1 is a cross-sectional view of a recording apparatus, such as a laser beam printer.

FIG. 1 is a cross-sectional view of a recording apparatus, such as a laser beam printer, in which the character processing method of the present invention is applicable.

A main body 100 (printer) of the apparatus receives and stores print information (character codes etc.), from information and macro instructions supplied from an external host computer, generates character patterns (to be generated by the character pattern process of the present invention), forms patterns, and forms an image on a recording sheet constituting the recording medium. There are also shown an operation panel—including switches and LED indicators for various operations, and a printer control unit 101 for controlling the entire printer 100 and analyzing the character information supplied from the host computer. The printer control unit 101 converts the character information into a video signal of corresponding character patterns for supply to a laser driver 102, which drives a semiconductor laser 103 and on-off switches the laser beam 104 emitted from the semiconductor laser 103 according to the input video signal. The laser beam 104 is laterally deflected by a rotary polygon mirror 105 to scan an electrostatic drum 106, thereby forming an electrostatic latent image of a character pattern thereon. The latent image is developed into a visible image by a developing unit 107 positioned around the electrostatic drum 106, and is transferred onto the recording sheet, which is composed of a cut sheet contained in a cassette 108 mounted on the main body 100 and supplied therefrom by a feed roller 109 and transport rollers 110 and 111 to the electrostatic drum 106.

The image processing apparatus of each embodiment described above exemplifies a laser beam printer. However, the present invention is not limited to this. The present invention is equally applied to an ink-jet printer to be described later.

(I) General Description of Apparatus Main Body

Figure 18:
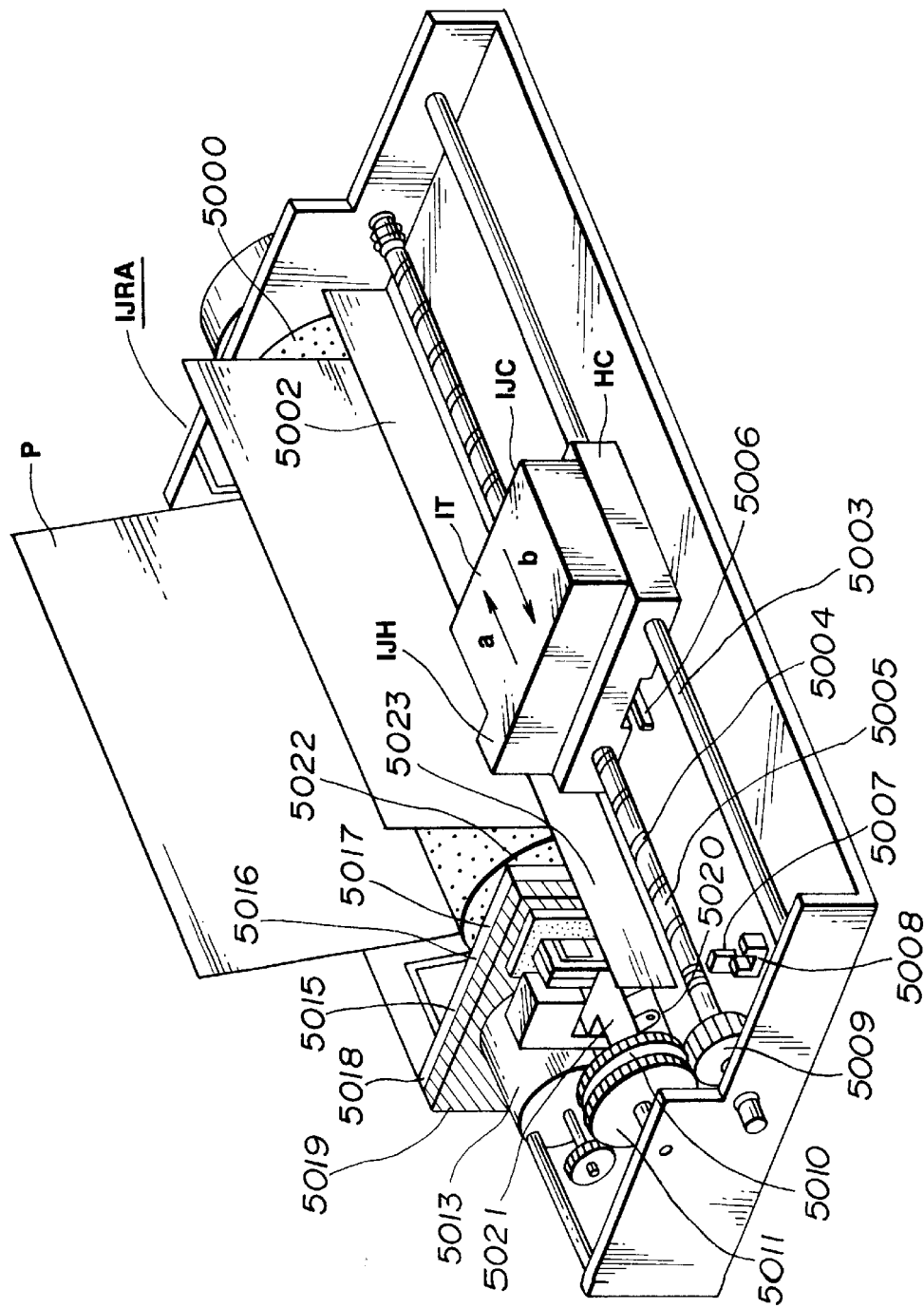
FIG. 18 is a perspective view showing the internal structure of an ink jet printer to which the present invention can be applied.

FIG. 18 is a perspective view of an ink-jet recording apparatus IJRA to which the present invention can be applied. Referring to FIG. 18, a carriage HC engages with a helical groove 5005 of a lead screw 5004 rotated interlockingly with normal/reverse rotation of a drive motor 5013 through driving force transmission gears 5011 and 5009 having a pin (not shown) and can be reciprocated in directions indicated by arrows a and b. An ink-jet cartridge IJC is mounted on the carriage HC. A paper press plate 5002 presses the paper in the carriage movement direction through a platen 5000. Photocouplers 5007 and 5008 are home position detecting means for detecting the presence of a lever 5006 of the carriage within this range to switch the rotational direction of the motor 5013. A member 5016 supports a cap member 5022 for capping the front surface of a recording head. A suction device 5015 draws the ink from the cap to recover the recording head through an opening 5023 in the cap. A cleaning blade 5017 is moved back and forth by a member 5019, and the cleaning blade 5017 and the member 5019 are supported on a main body support plate 5018. The blade need not have this form, but can be replaced with a known cleaning blade. A lever 5021 starts suction to recover the recording head. The lever 5012 is moved together with movement of a cam 5020 engaged with the carriage. The driving force from the driving motor is controlled by a known transmitting means such as clutch switching.

Capping, cleaning and suction recovery are performed by desired processes at the corresponding positions in accordance with the behavior of the lead screw 5004 when the carriage reaches the home position. If desired operations are performed at known timings, any scheme can be employed in this embodiment.

(II) Description of Control Arrangement

Figure 19:
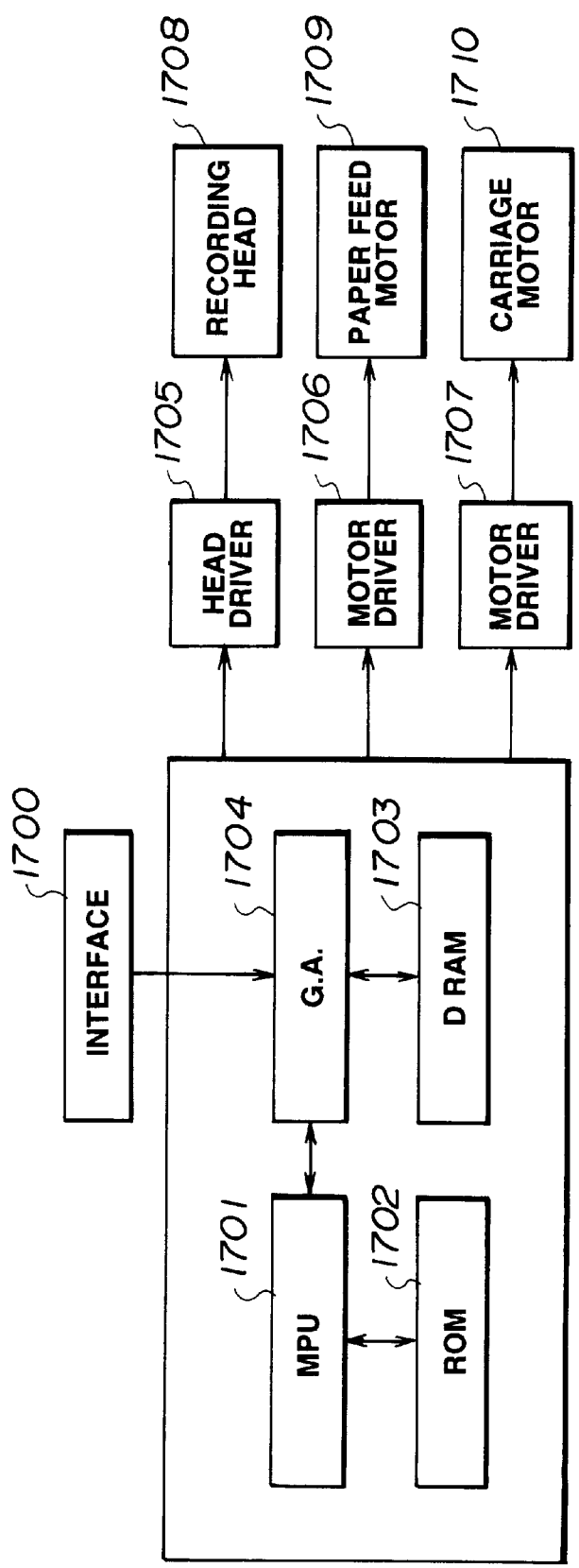
FIG. 19 is a block diagram of a control circuit of the ink-jet printer shown in FIG. 18.

A control arrangement for executing recording control of the respective components in the apparatus will be described with reference to the block diagram in FIG. 19. A control circuit includes an interface 1700 for inputting a recording signal, an MPU 1701, a program ROM 1702 for storing control programs executed by the MPU 1701, a dynamic RAM 1703 for storing various data (e.g., the recording signal and recording data supplied to the head), a gate array 1704 for controlling and supplying the recording data to a recording head 1708 and performing transfer control of data between the interface 1700, the MPU 1701, and the RAM 1703, a carriage motor 1710 for moving the recording head 1708, a paperfeed motor 1709 for conveying a recording sheet, a head driver 1705 for driving the head, and motor drivers 1706 and 1707 for driving the paperfeed motor 1709 and the carriage motor 1710, respectively.

The operation of the above control arrangement will be described below. When a recording signal is input to the interface 1700, a recording signal is converted into print recording data by the gate array 1704 and the MPU 1701. The motor drivers 1706 and 1707 are driven to drive the recording head in accordance with the recording data supplied to the head driver 1705, thereby printing the recording information.

It is possible to incorporate the constituent components of the present invention in the control arrangement of the ink-jet printer. The present invention is applicable to the ink-jet printer in addition to the laser beam printer.

Figure 2:
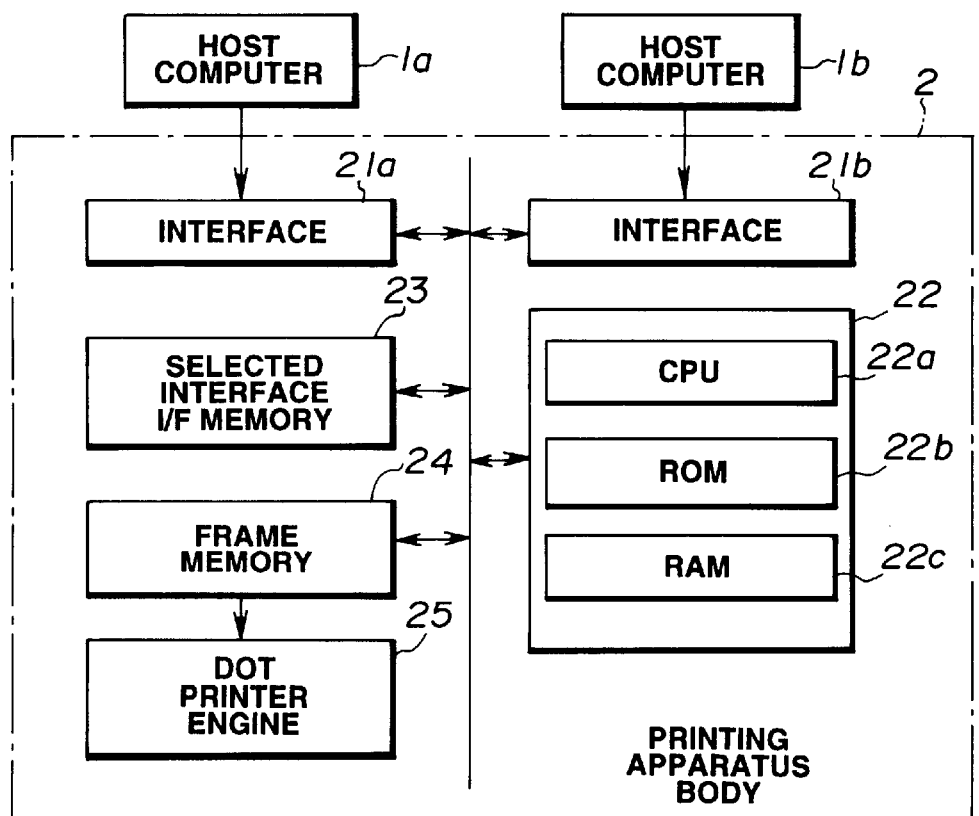
FIG. 2 is a block diagram showing controlling construction of a printing apparatus common to all embodiments.

FIG. 2 is a block diagram showing a construction of a controller of a printing apparatus.

1a, 1b are host computers. 2 is a body of the printing apparatus. Each of the host computers 1a and 1b sends data such as print data to a printing apparatus. Each of the interfaces 21a and 21b can receive data from the host computers 1a and 1b.

Controller 22 controls the entire printing apparatus. The controller consists of a CPU 22a, ROM 22b which stores a program of process and outline font data, and so on, and also consists of a RAM 22c which includes receiving buffers and a work area which enables the CPU 22a to execute the program. This work area of the RAM 22c stores information which defines the size of each buffer.

Memory 23 stores information for the interface presently selected.

Frame memory 24 is capable of storing bit map data for one page. The bit map data which are stored in the frame memory 24 are printed by dot printer engine 25.

In the above printing apparatus, the CPU 22a executes a process in accordance with a program which is stored in ROM 22b. This process determines the size of each receiving buffer (a part of area of RAM 22c) corresponding to each interface. In this embodiment, the CPU 22a exercises an ensuring process, in accordance with a program which is stored in ROM 22b, to ensure the size of the receiving buffer which has been determined by the ROM 22b.

Taking means (in this embodiment, the CPU 22a executes the taking process in accordance with a program stored in ROM 22b) takes data through each interface to be stored in the determined receiving buffer.

The printing apparatus can have an adequate size of receiving buffer corresponding to each interface.

Figure 3:
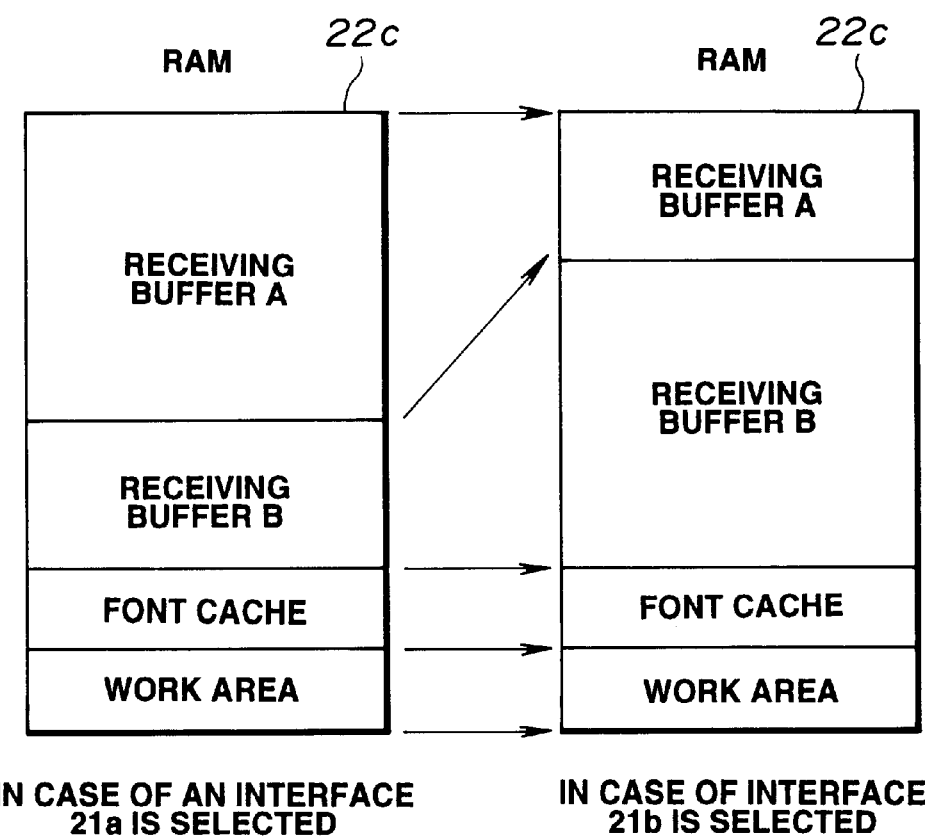
FIG. 3 is a schematic block diagram of a condition of a memory map of RAM.

The above-mentioned embodiment will be further described with reference to FIG. 3. FIG. 3 is a schematic block diagram of a condition of a memory map of RAM 22c.

In the first embodiment, data from the host computer 1a are sequentially stored in the receiving buffer A of the RAM 22c through the interface 21a. Data from the host computer 1b are sequentially stored in the receiving buffer B of the RAM 22c through the interface 21b. Along with the storing step mentioned above, the CPU 22a controls the following steps. The data which are not processed in the receiving buffer are read and transferred to the frame memory 24 as image data or the font patterns that correspond to the data as character data are transferred and finally printed.

As shown in FIG. 3, in this embodiment, the selected receiving buffer is larger than the other one (the non-selected buffer is smaller than the one in the prior art).

As mentioned above, host computers 1a and 1b can simultaneously send data to the printing apparatus and the printing apparatus can give priority to the selected interface having the smaller area of RAM 22c by varying the size of the receiving buffer.

Figure 4:
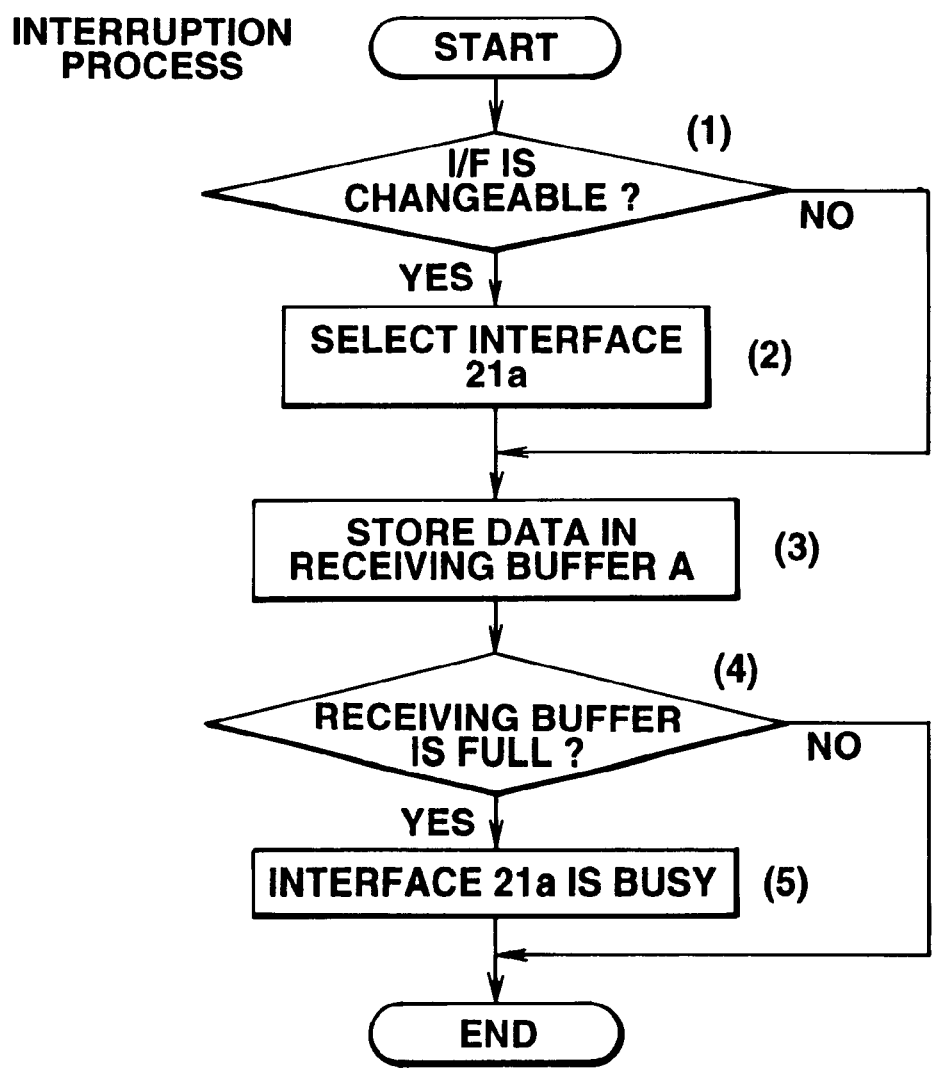
FIG. 4 is a flow chart showing one example of data interruption processing according to the first embodiment.

To execute the process mentioned above, the CPU 22a carries out the program described in FIG. 4 as a flow chart stored in the ROM 22b.

FIG. 4 is a flow chart showing one example of data interruption processing according to the first embodiment. In FIG. 4, (1)–(5) show each step of the flowchart.

When data are transferred from the host computer 1a, an interrupt signal is supplied to the interface 21a. In response to the interrupt signal, the CPU 22a performs the process according to the flow chart of FIG. 4.

First of all, in step (1) the CPU 22a judges whether an interface can change one to another at present. If YES in step (1), the flow advances to step (2) and the CPU 22a selects interface 21a and stores the information from selected interface 21a in selected interface memory 23. The CPU 22a then expands the receiving buffer A in the RAM 22c (reduces the receiving buffer B). After that, the flow advances to step (3).

If NO in step (1), the flow advances to step (3) directly. In step (3), the CPU 22a takes data through the interface 21a and stores the data in the receiving buffer A in the RAM 22c.

In step (4), the CPU 22a determines whether the receiving buffer A is full. If YES in step (4), the CPU 22a executes a busy process and the program flow ends. CPU 22a performs the same procedure if interface 21b is selected.

The first printing process according to the present invention will be described with reference to the flow chart in FIG. 5.

Figure 5:
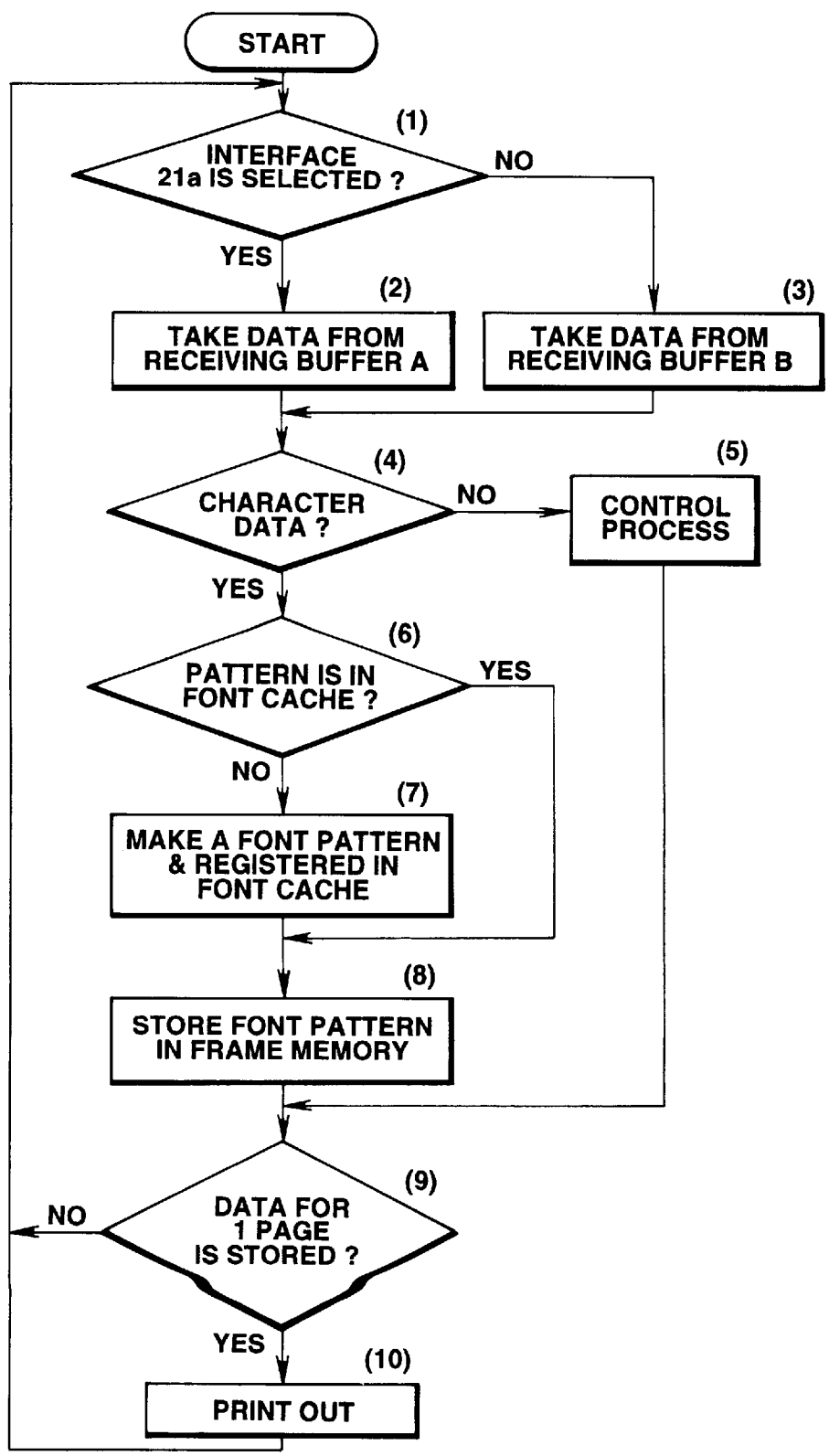
FIG. 5 is a flow chart showing one embodiment of a first printing process.

FIG. 5 is a flow chart showing one embodiment of the first printing process. In FIG. 5, (1)–(10) show each step in the process.

In step (1), the CPU 22a determines which interface is selected at present. If the interface 21a is selected, the CPU 22a takes data from the receiving buffer A (Step(2)). If the interface 21b is selected, the CPU 22a takes data from the receiving buffer B (step (3)).

In step (4), the CPU 22a determines whether the data which is taken is character data. If YES in step (4), the CPU 22a determines in step (6) whether a character pattern which corresponds to the data exists in the font cache area in the RAM 22c. If NO in step(6), the process proceeds to step (7) in which a font pattern is made and registered in the font cache area in RAM 22c. If YES in step (6) the process proceeds directly to step (8). In step (8), the font pattern is stored in frame memory 24 and the flow proceeds to step (9). If NO in step (4), the CPU 22a executes a control process in accordance with the data, and the flow advances to step (9).

In step 9, the CPU 22a determines whether data for 1 page are stored in the frame memory 24.

If YES in step 9, the CPU 22a transfers the data stored in the frame memory 24 to the engine of the dot printer 25 and prints. The flow then returns to step (1) in FIG. 5. If NO in step 9, the flow returns to step (1) directly. As mentioned above, the printing apparatus can give a priority to the selected interface with a little amount of RAM for receiving data.

In the above embodiment, the printing apparatus with two interfaces is described. But in application the number of interfaces is not limited. The CPU 22a can ensure the necessary receiving buffer in accordance with the number of interfaces.

In the above embodiment, the page printer prints data after preparing data for 1 page. But, this invention can be applied to a line printer or a serial printer which executes a printing process line by line such as an ink jet printer.

Description of Second Embodiment

Figure 6:
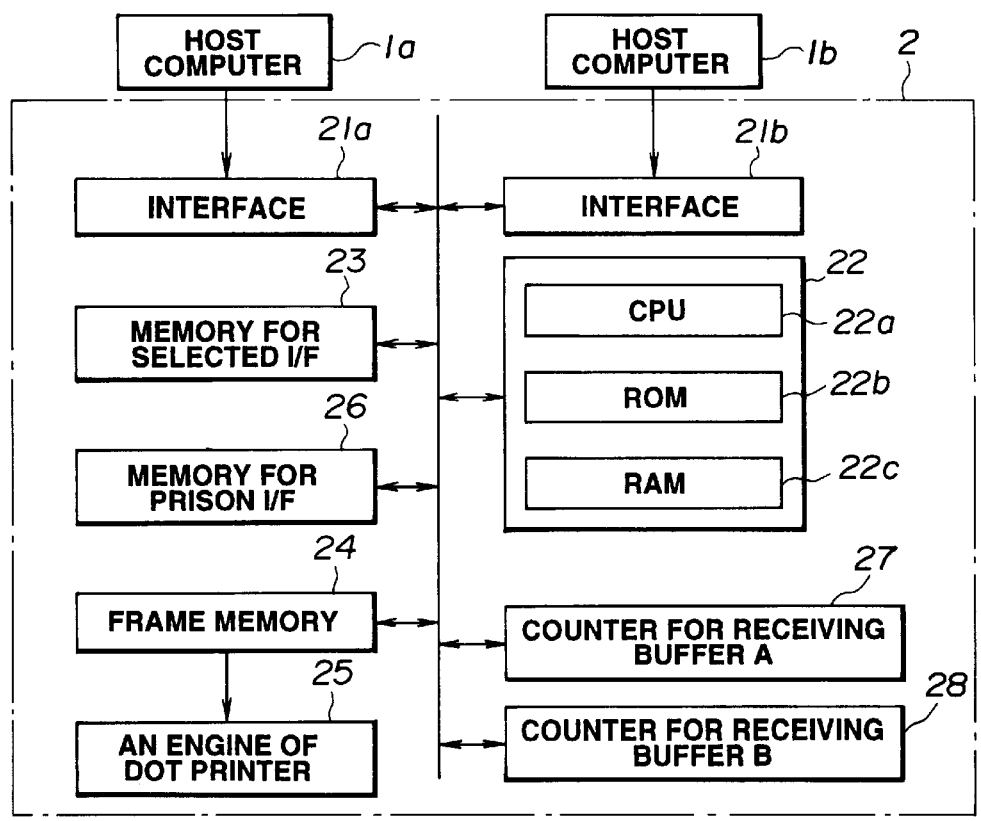
FIG. 6 is a block diagram showing a construction of a controller according to a second embodiment of a printing apparatus.

FIG. 6 is a block diagram showing a construction of a controller according to a second embodiment of a printing apparatus. Symbols are the same as the ones used in FIG. 2.

In FIG. 6, 26 is a memory for storing information indicating which interface has priority at present. 27 is a counter for determining whether the receiving buffer A which corresponds to the interface 21a is full or not. 28 is a counter for determining whether the receiving buffer B which corresponds to the interface 21b is full or not. These counters count while the receiving buffers are full.

In this printing apparatus, CPU 22a changes between interface 21a and 21b in accordance with the result of monitoring the counters 27 and 28 (in this embodiment, which means are functions of the CPU 22a). So the printing apparatus can always select an effective interface for use.

In addition, CPU 22a can change between interface 21a and 21b in accordance with a result of detecting means which is for detecting an end of data at each interface. So the printing apparatus can always select a usable interface speedily. This embodiment will be further described with reference to FIG. 7.

Figure 7:
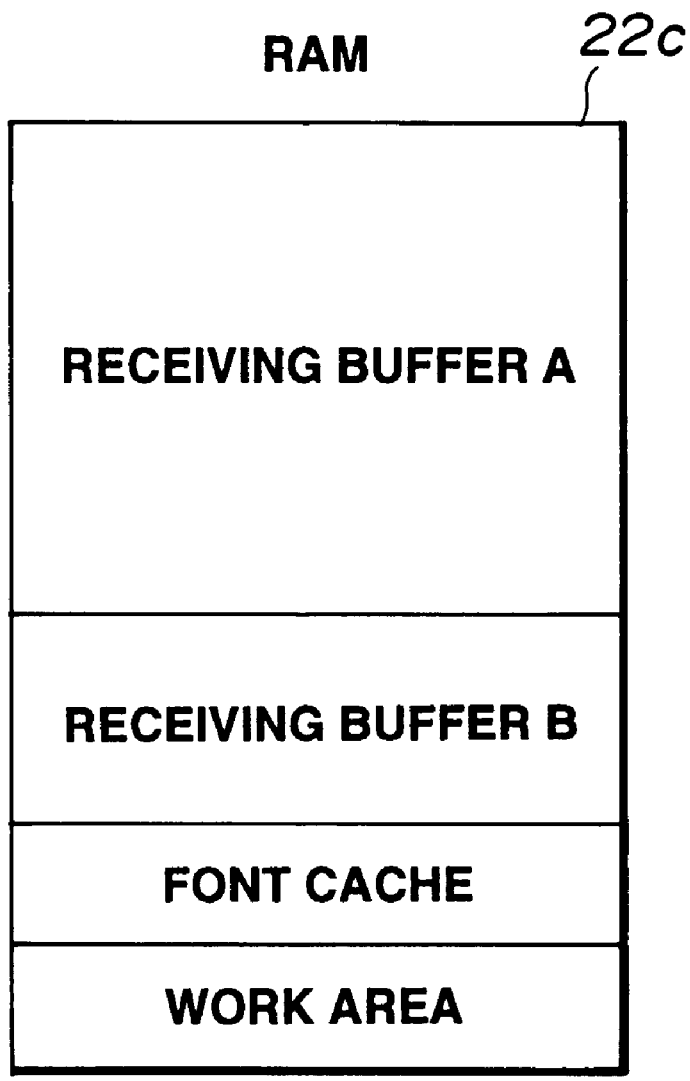
FIG. 7 is a schematic block diagram of a condition of a memory map of RAM in FIG. 6.

FIG. 7 is a schematic block diagram of a condition of memory map of RAM 22c in FIG. 6. In the second embodiment, data transferred from the host computer 1a through the interface 21a are sequentially stored in the receiving buffer A. Data transferred from the host computer 1b through the interface 21b are sequentially stored in the receiving buffer B.

With the storing step mentioned above, the CPU 22a reads data which are not processed in the receiving buffer and stores the data in the frame memory 24 as image data or transfers font patterns which correspond to the data to the frame memory 24 and finally the data are printed.

In this embodiment, the CPU 22a ensures two receiving buffers corresponding to each interface 21a and 21b. So, host computers 1a and 1b can transfer data to the printing apparatus simultaneously.

Figure 8:
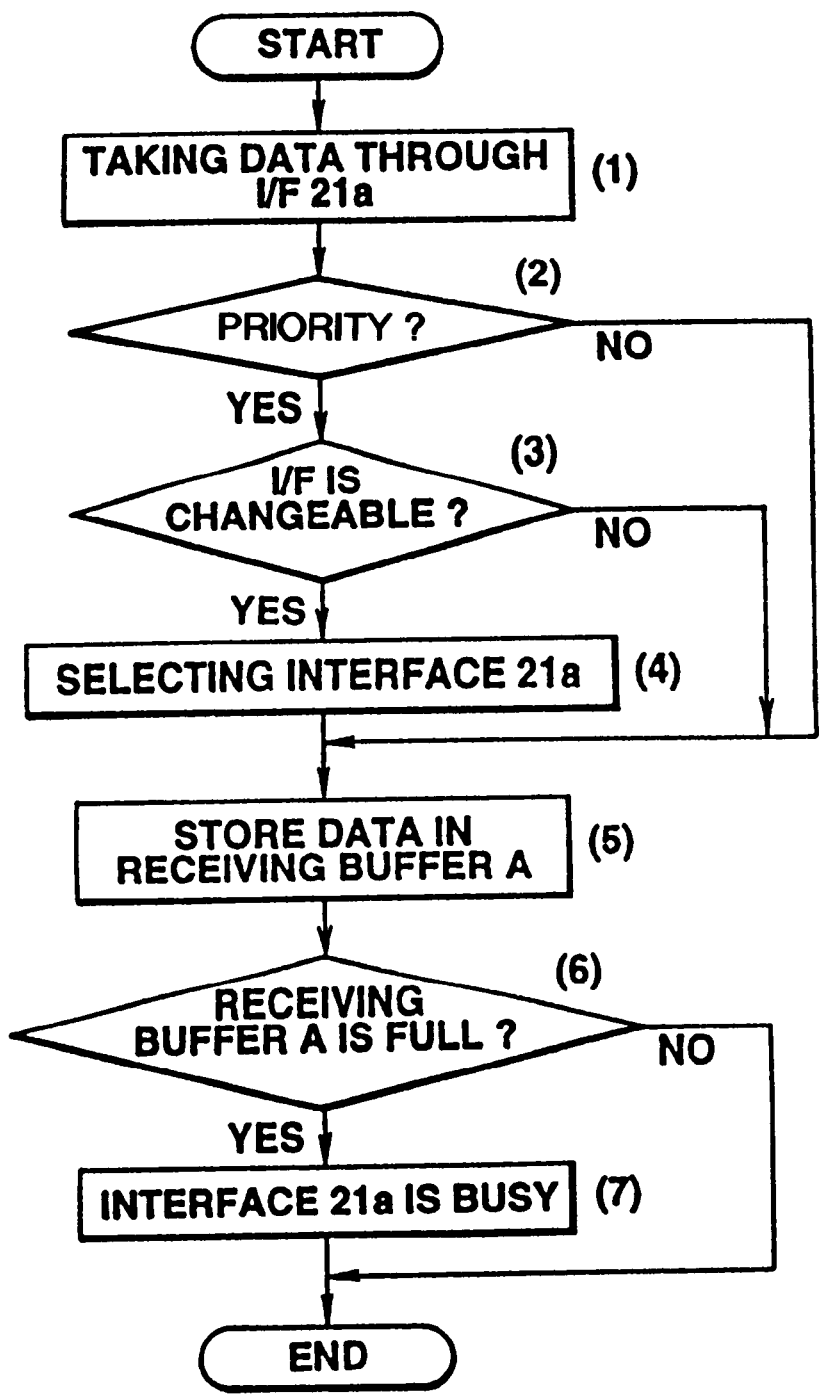
FIG. 8 is a flow chart showing a second embodiment of a data interruption receiving process of a printing apparatus.

To execute the process mentioned above, the CPU 22a in the controller 22 carries out the program described in FIG. 8 as a flow chart which is stored in ROM 22b.

FIG. 8 is a flow chart showing a data interruption receiving process according to second embodiment of a printing apparatus. (1)–(7) in FIG. 8 show each of the steps of the process.

In step (1) in FIG. 8, the CPU 22a takes data through the interface 21a and determines in step (2) whether the interface 21a is given priority. (The process for determining priority is discussed below.) If yes in step (2), the flow advances to step (3). In step (3), the CPU 22a determines whether the interface is changeable at present.

If YES, in step (4) the CPU 22a selects the interface 21a and stores information which shows that the interface 21a is selected in the memory 23.

If NO in step (3) or if NO in step (2), the flow advances to step (5) directly. In step (5), the CPU 22a stores the data which is taken in step (1) in the receiving buffer A of the RAM 22c.

In step (6), the CPU 22a determines whether the receiving buffer A is full by referring to counter 27. If YES in step (6), the CPU 22a exercises a busy process and other processes in step (7). A description of the printing process is omitted.

A Process for determining which interface is given priority in the printing apparatus will be described with reference to FIG. 9.

Figure 9:
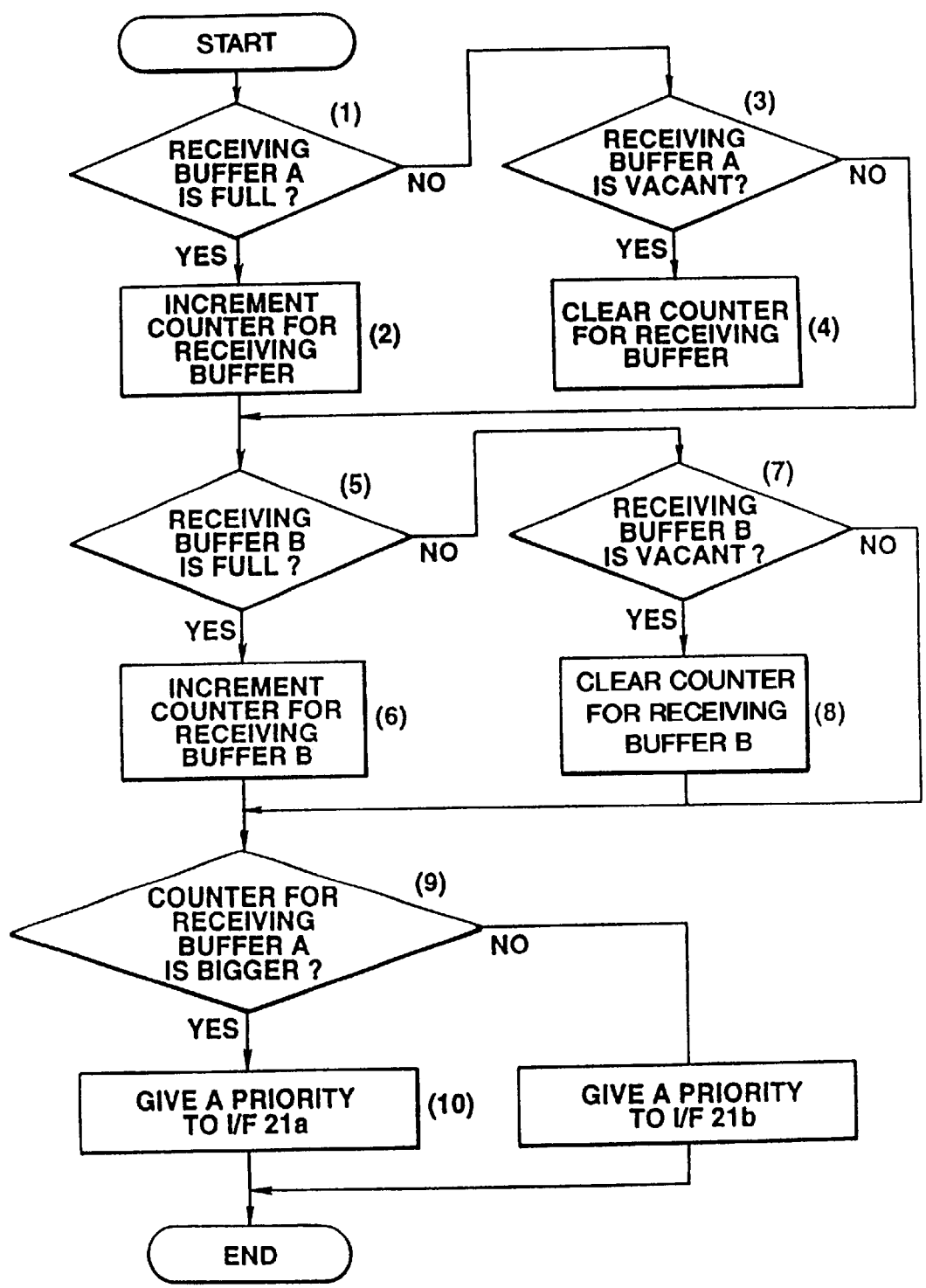
FIG. 9 is a flow chart for determining an interface to take priority in a printing apparatus.

FIG. 9 is a flow chart for determining an interface to take priority in the printing apparatus. (1)–(11) show each of the steps in the process.

In step (1), the CPU 22a determines whether the receiving buffer A is full. If YES, in step (2) the counter 27 (FIG. 6) for the receiving buffer A counts up. This is for timing how long it is that the full condition exists. If NO, in step (3) the CPU 22a determines if receiving buffer A is vacant. If YES, the CPU 22a clears counter 27 in step (4) and proceeds to step (5). If NO in step (3), the process proceeds directly to step (5). In step (5), the CPU 22a determines whether the receiving buffer B is full. If YES in step (5), the counter 28 for the receiving buffer B is incremented If NO in step (5), the CPU 22a determines whether the receiving buffer B is vacant in step (7). If YES is step (7), the CPU 22a clears counter 28 in step (8). In step (9), the CPU 22a compares the numbers in counter 27 and counter 28. If the number in counter 27 is larger than the number in counter 28, the CPU 22a stores in memory 26 information indicating that interface 21a is an interface to be given priority, in step (10). The process ends and the CPU 22a executes another process.

If the number in counter 28 is larger than the number in counter 27, the CPU 22a stores in memory 26 information indicating that the interface 21b is an interface to be given priority, in step (11). The process ends and the CPU 22a executes another process.

With the above-described invention, the printing apparatus can receive data efficiently from a lot of computers.

In the above embodiment, a printing apparatus with two interfaces is not limited. The CPU 22a can ensure a receiving buffer in accordance with the number of interfaces.

In the above embodiment, a page printer which prints data after preparing data for 1 page is described. However, this invention can be applied to a line printer or a serial printer which executes a printing process line by line such as an ink jet printer described in FIG. 18.

In the above embodiment, the CPU 22a determines the condition of utility of the receiving buffer in accordance with the time in which the receiving buffer is full. However, the CPU 22a may determine the condition of utility by counting the number of data to be read in the receiving buffer.

Description of Third Embodiment

Figure 10:
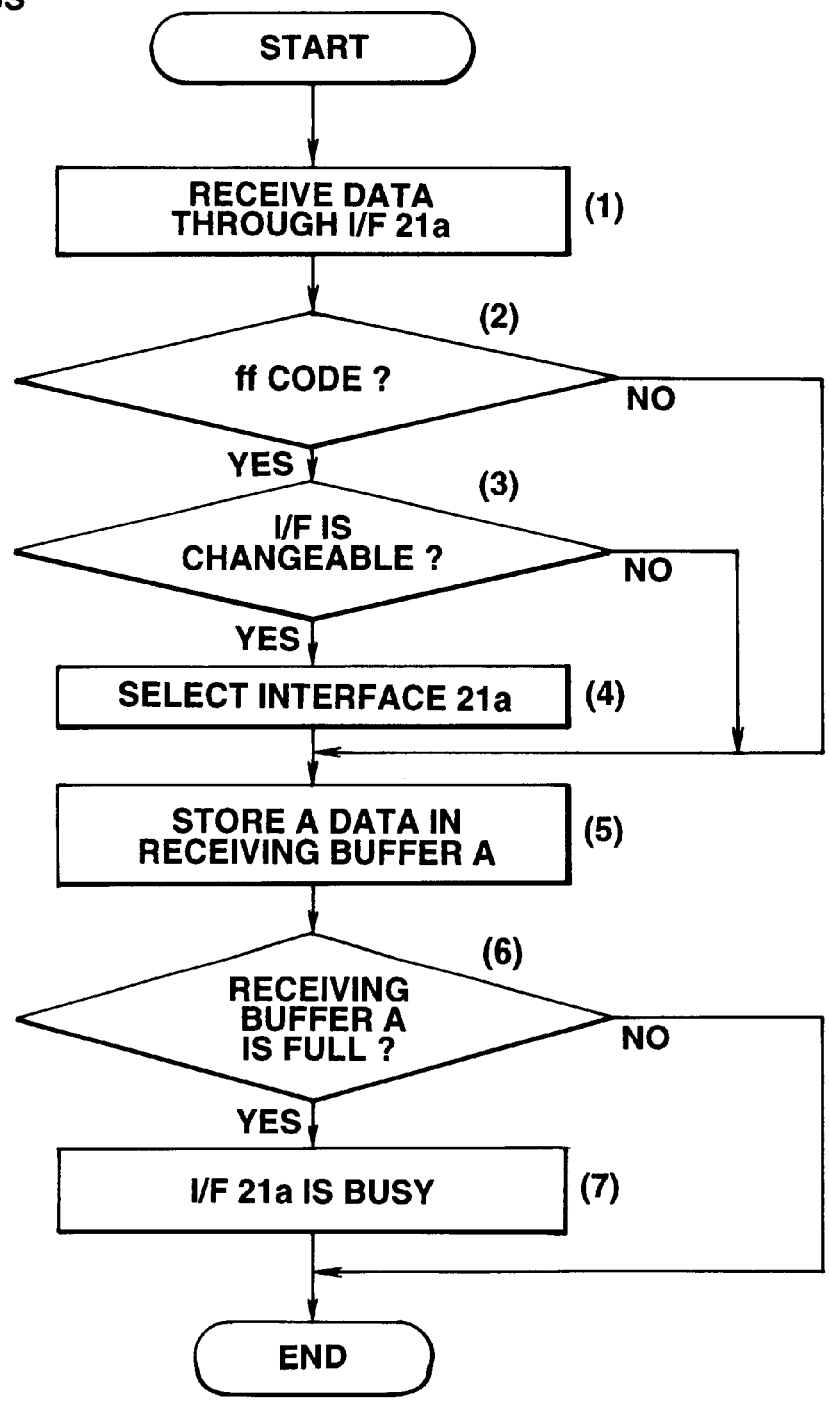
FIG. 10 is a flow chart showing a data interrupt receiving process of a printing apparatus according to a third embodiment.

FIG. 10 is a flow chart showing a data interrupt receiving process of a printing apparatus according to the third embodiment. In step (1) in FIG. 10, the CPU 22a receives data through the interface 21a. In step (2), the CPU 22a determines if the data is a form-feed (ff) code.

If YES in step (2), the CPU 22a determines whether the interface can be changed from one to another. If YES in step (3), the CPU 22a selects interface 21a in step (4) and stores information indicating that interface 21a is selected, in memory 23. The flow then advances to step (5).

If NO in step (2), the flow advances to step (5) directly. In step (5) the CPU 22a stores the received data in the receiving buffer A of the RAM 22c. The CPU 22a then determines whether the receiving buffer A is full in step (6).

If YES in step (6), the CPU 22a executes the busy process and other printing processes in step (7). A description of the printing process is omitted.

In this embodiment, the CPU 22a determines the end of data in accordance with the form feed code. However, the CPU 22a may determine the end of data by recognizing that a printing language has changed. (The CPU 22a can distinguish one language from another by storing a specific code for each language.)

Description of Fourth Embodiment

Figure 11:
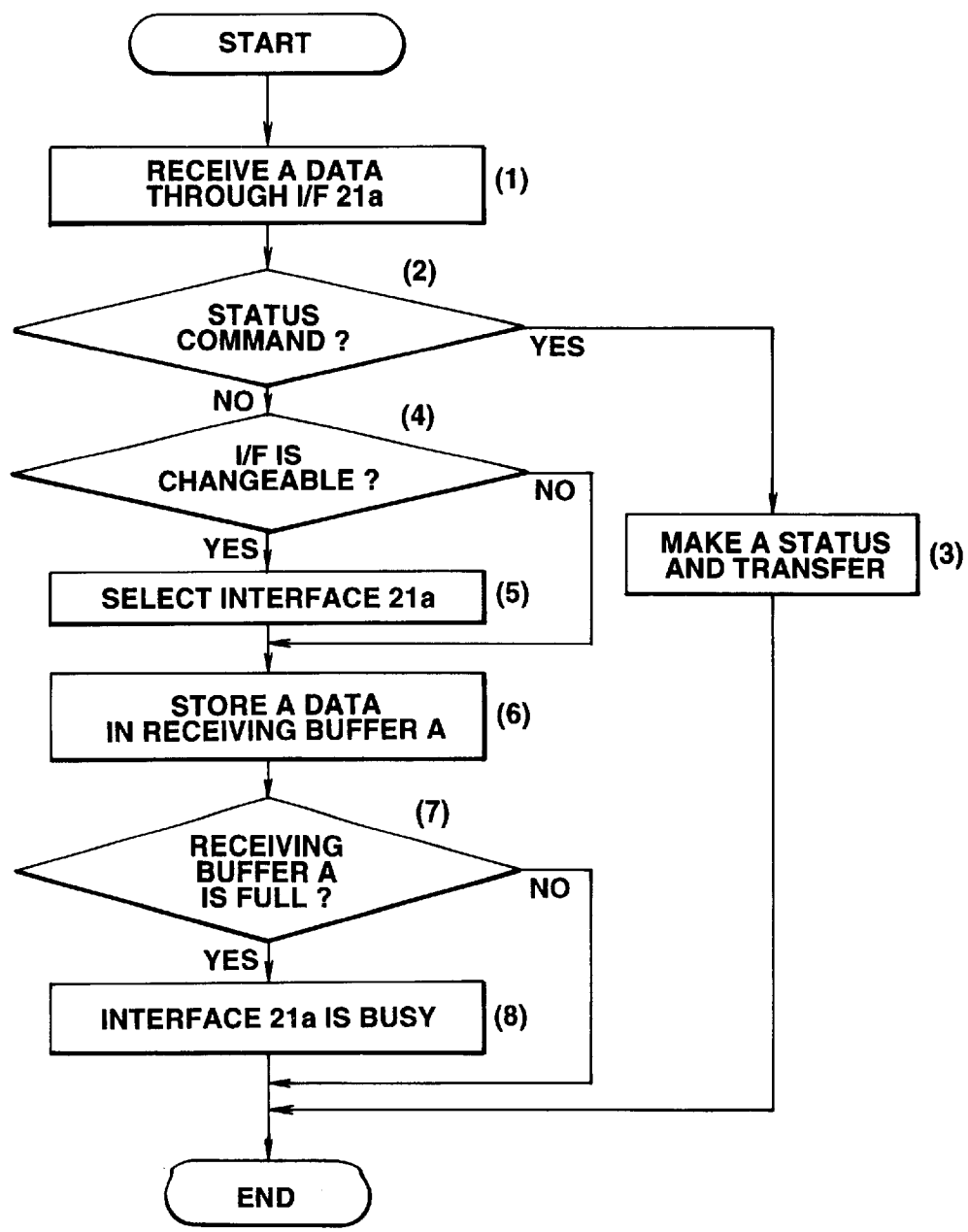
FIG. 11 is a flow chart showing a fourth embodiment of a data interrupt receiving process of a printing apparatus.

In FIG. 11, in spite of a selection condition, the CPU 22a can transfer a predetermined status through the two-way interface. So the printing apparatus can inform the condition of each interface in spite of the selection condition.

FIG. 11 is a flow chart showing a data interrupt receiving process according to a fourth embodiment of a printing apparatus according to the present invention. (1)–(8) show each step of the process.

In step (1), the CPU 22a receives data through the interface 21a. In step (2), the CPU 22a determines whether the data is a status request command. If YES in step (2), the flow advances to step (3), the CPU 22a makes a status of the printing apparatus and the CPU 22a transfers the status from the interface 21a and executes another process. If NO in step (2), the CPU 22a determines in step (4) whether the interface is changeable. (e.g., whether information is presently being received through the selected interface.) If NO in step (4), the flow advances to step (6) directly. If YES in step (4), the CPU 22a selects interface 21a and stores information indicating that the interface 21a is selected, in memory 23. The flow then advances to step (6). In step (6), the CPU 22a stores the received data in receiving buffer A in the RAM 22c, and the CPU 22a determines whether the receiving buffer A is full in step (7). If YES in step (7), the CPU 22a executes a busy process and other processes. A description of the printing process is omitted.

As mentioned above, the CPU 22a executes the process in accordance with the status request command, regardless of the condition of the host computers selection. Each interface is ensured a receiving buffer in this embodiment. However, the CPU 22a can interpret the data with the status request command with one or no receiving buffer through data can be received through one interface at once.

The CPU 22a does not change from one interface to another and doesn't store a command in the receiving buffer in this embodiment but the CPU 22a can execute the process as like for the ordinary data.

Description of Fifth Embodiment

Figure 12:
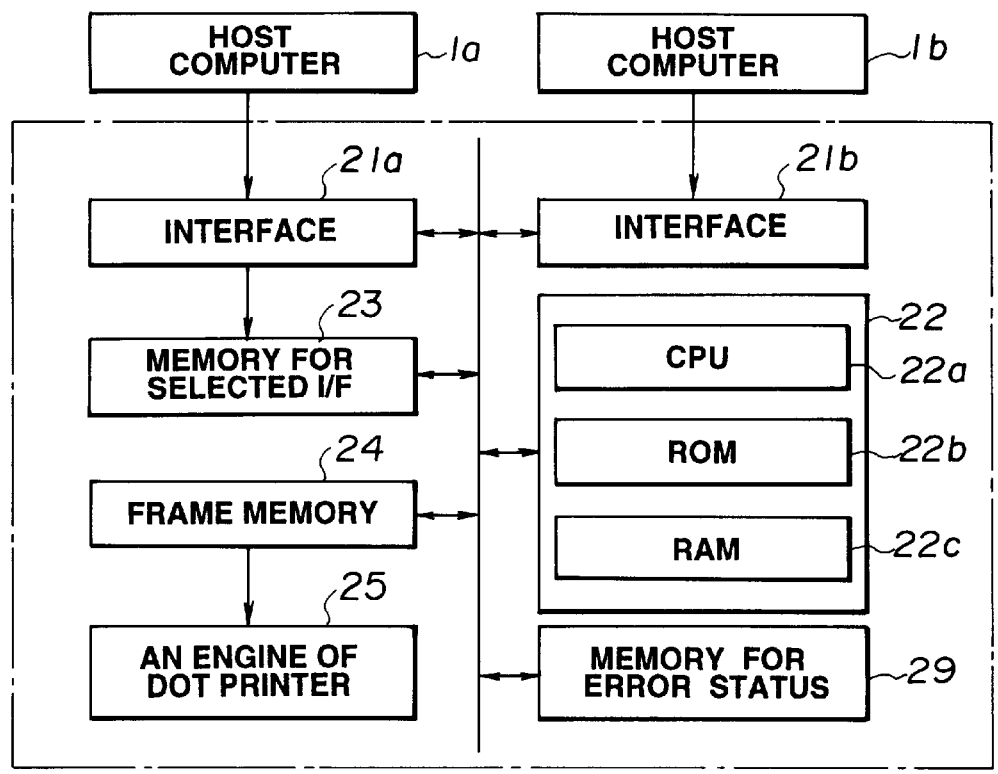
FIG. 12 is a block diagram showing a construction of a controller for a printing apparatus according to a fifth embodiment.

FIG. 12 is a block diagram showing a construction of a controller of a printing apparatus according to a fifth embodiment.

In FIG. 12, 29 is a memory for error status which stores an error condition.

A control means controls an interface which relates to an error to be changed (This control is executed by the CPU 22a's function) in accordance with a result of monitoring an error condition. The CPU 22a can restrict the interface relating to an error process in this printing device.

Data from the host computer 1a are serially stored in the receiving buffer A of the RAM 22c through the interface 21a and data from the host computer 1b are serially stored in the receiving buffer B of the RAM 22c through the interface 21b.

With the process mentioned above, the CPU 22a reads data which is to be processed sequentially. The CPU 22a stores the data in the frame memory 24 directly or stores a font pattern corresponding to the data in the frame memory 24, and finally a print process is executed.

In this embodiment, the CPU 22a ensures that a receiving buffer corresponds to each interface, so that the host computers 1a and 1b can transfer data simultaneously.

Figure 13:
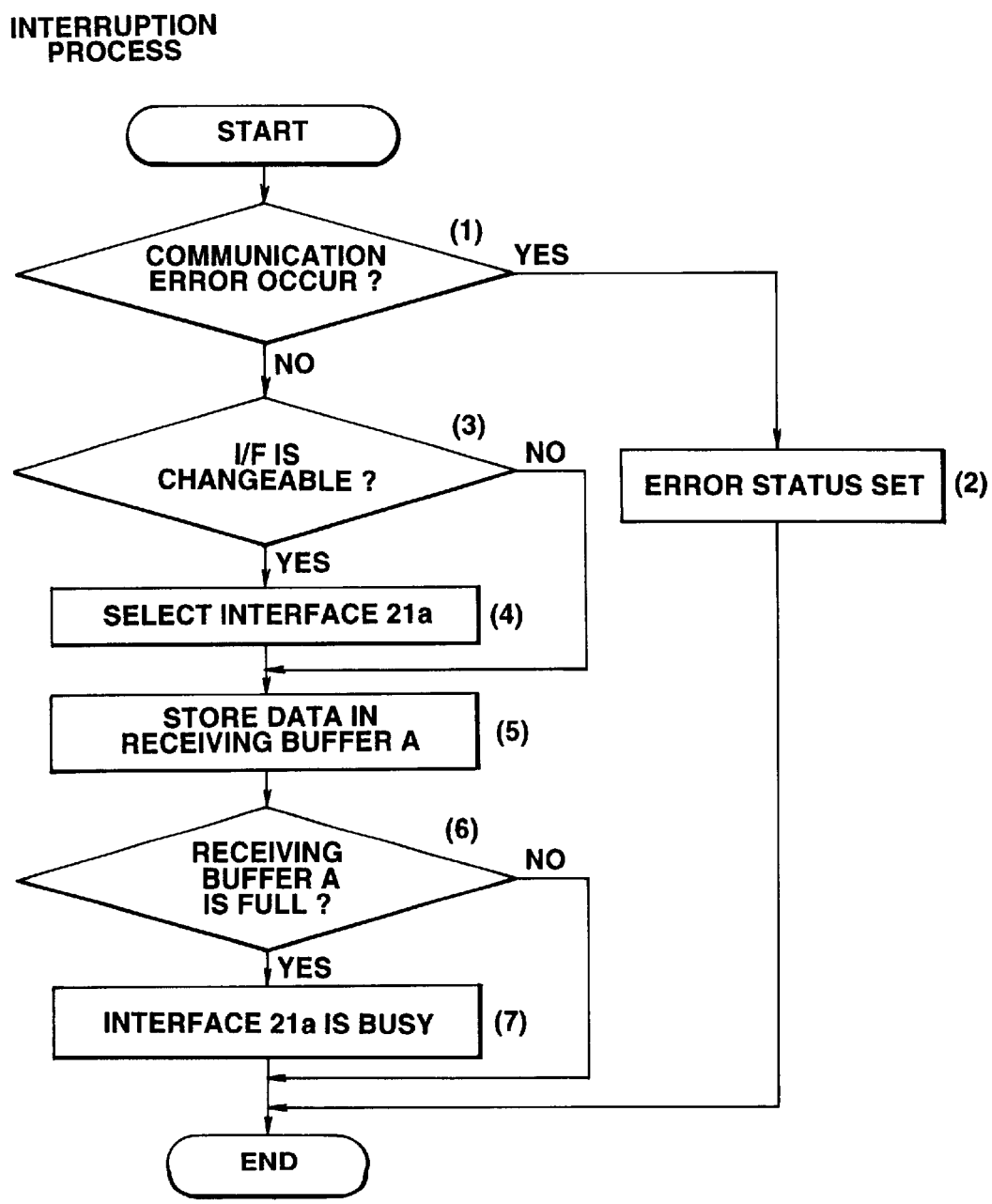
FIG. 13 is a flow chart showing a data interruption receiving process of a printing apparatus according to the fifth embodiment.

To execute the process mentioned above, the CPU 22a executes a program stored in the ROM 22b which is shown in FIG. 13 as a flow chart. FIG. 13 is a flow chart showing a data interruption receiving process of a printing apparatus according to the fifth embodiment. (1)~(7) show each step of the process.

In step (1), the CPU 22a determines whether a communication error has occurred in the interruption reception.

If YES in step (1), the CPU 22a stores error information in an error status memory 29 and the process is finished.

If NO in step (1), the CPU 22a determines whether the interface is changeable in step (3). If YES in step (3), the CPU 22a selects the interface 21a and the CPU 22a stores information indicating that the interface 21a is selected, in the memory 23.

If NO in step (3), the flow advances to step (5) directly. The CPU 22a receives data through the interface 21a and stores the data in receiving buffer A in the RAM 22c. The CPU 22a then determines whether the receiving buffer A is full in step (6).

If YES in step (6), the CPU 22a executes a busy process and the process is finished.

CPU 22a performs the same process for interface 21b.

Figure 14:
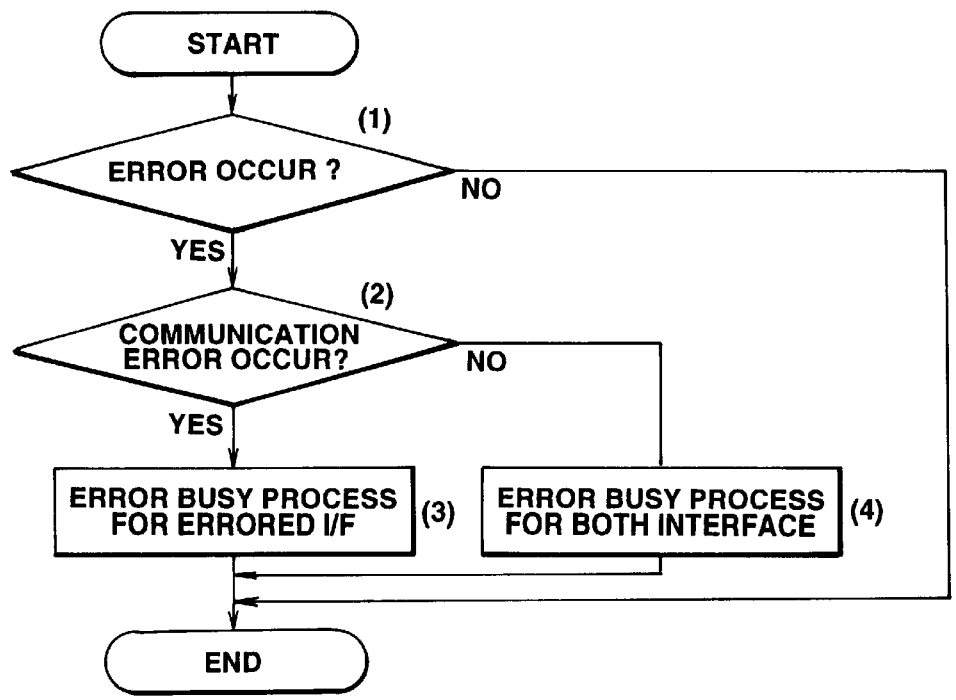
FIG. 14 is a flow chart showing a first error process of a printing apparatus.

FIG. 14 is a flow chart showing a first error recovering process of a printing apparatus. (1)~(4) show each of the steps of the process. In the described embodiments, the error recovery process includes a process of deciding which interface is in error and informing a user accordingly (CPU 22a performs these functions.)

In this process, the CPU 22a determines whether an error condition is occurring in the printing apparatus in accordance with the memory for error status.

If NO in step (1), the process is finished. If YES, in step (2) the CPU 22a determines whether the error is due to a communication error.

If YES in step (2), the CPU 22a executes an error process (produces busy signals) only for the interface which relates to the error.

If NO in step (2) (for example: if the error has occurred because a cover is left opened), the CPU 22a executes in step (4) an error process for both of the interfaces because the data through all interfaces should be stopped and the process is finished.

According to the third embodiment described above, the CPU 22a changes the interface in accordance with a kind of error. Accordingly, the host computers can continue transferring the data through the interfaces which do not relate to the error.

In this embodiment, the CPU 22a ensures that each receiving buffer correspond to each interface. But the CPU 22a can proceed for an error in the same way with one or no receiving buffer.

Description of sixth Embodiment

Figure 15:
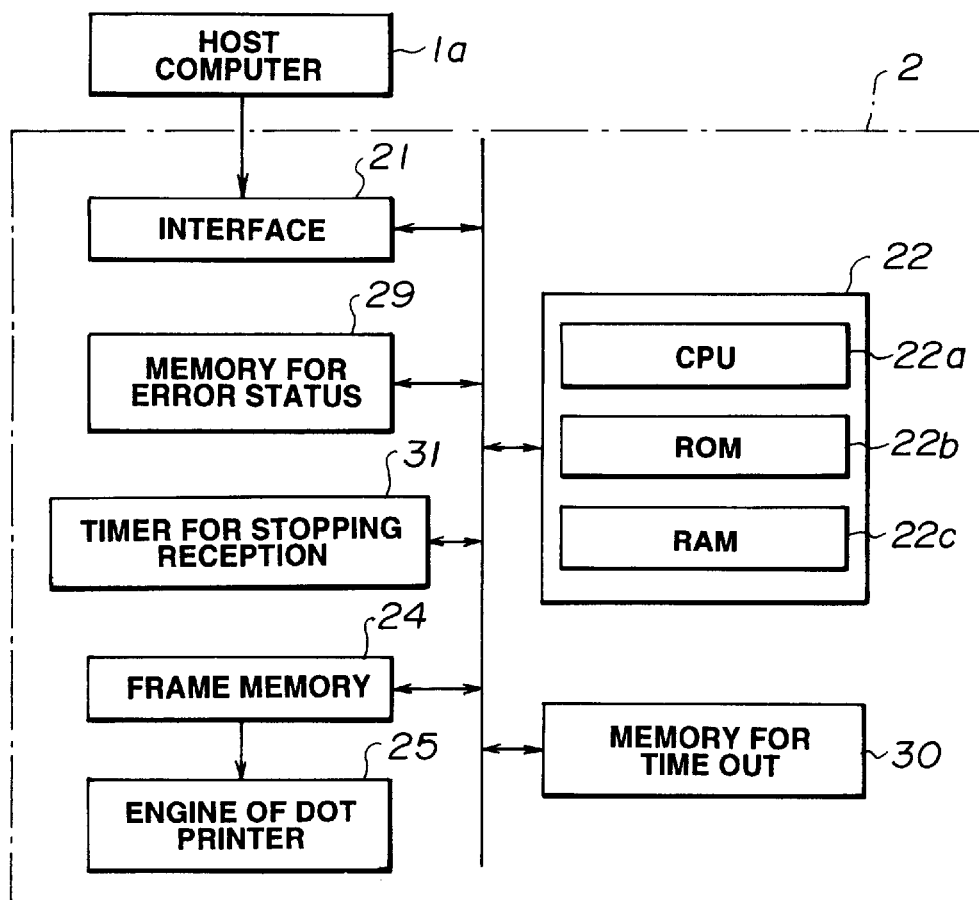
FIG. 15 is a block diagram of a printing apparatus according to the sixth embodiment.

FIG. 15 is a block diagram of a printing apparatus according to the sixth embodiment. 30 is a memory for time out information relating to the data transmitting. 31 is a timer for counting a stopping time of data transmission.

Data skip means (this function is executed by CPU 22a in this embodiment) skips data in this printing apparatus. The data are transferred through the interface which has a transmitting error detected by a monitoring means (CPU 22a).

The skip continues until a generating means (the timer for stopping reception 31) generates a time out signal by measuring a time of transferring data through the interface. Accordingly, the CPU 22a can restrict waste process for the data after occurrence of a transferring error. The data from the host computer 1a are sequentially stored in the receiving buffer A of the RAM 22c through the interface 21 in the sixth embodiment. Of course, it is possible to include a host computer 1b that sequentially stores data in the receiving buffer B of RAM 22c.

With the storing step mentioned above, the CPU 22a reads the data which are to be processed and stores the data in the frame memory 24 as image data or stores font patterns in the frame memory corresponding to the data. Finally the printing process is executed.

Figure 16:
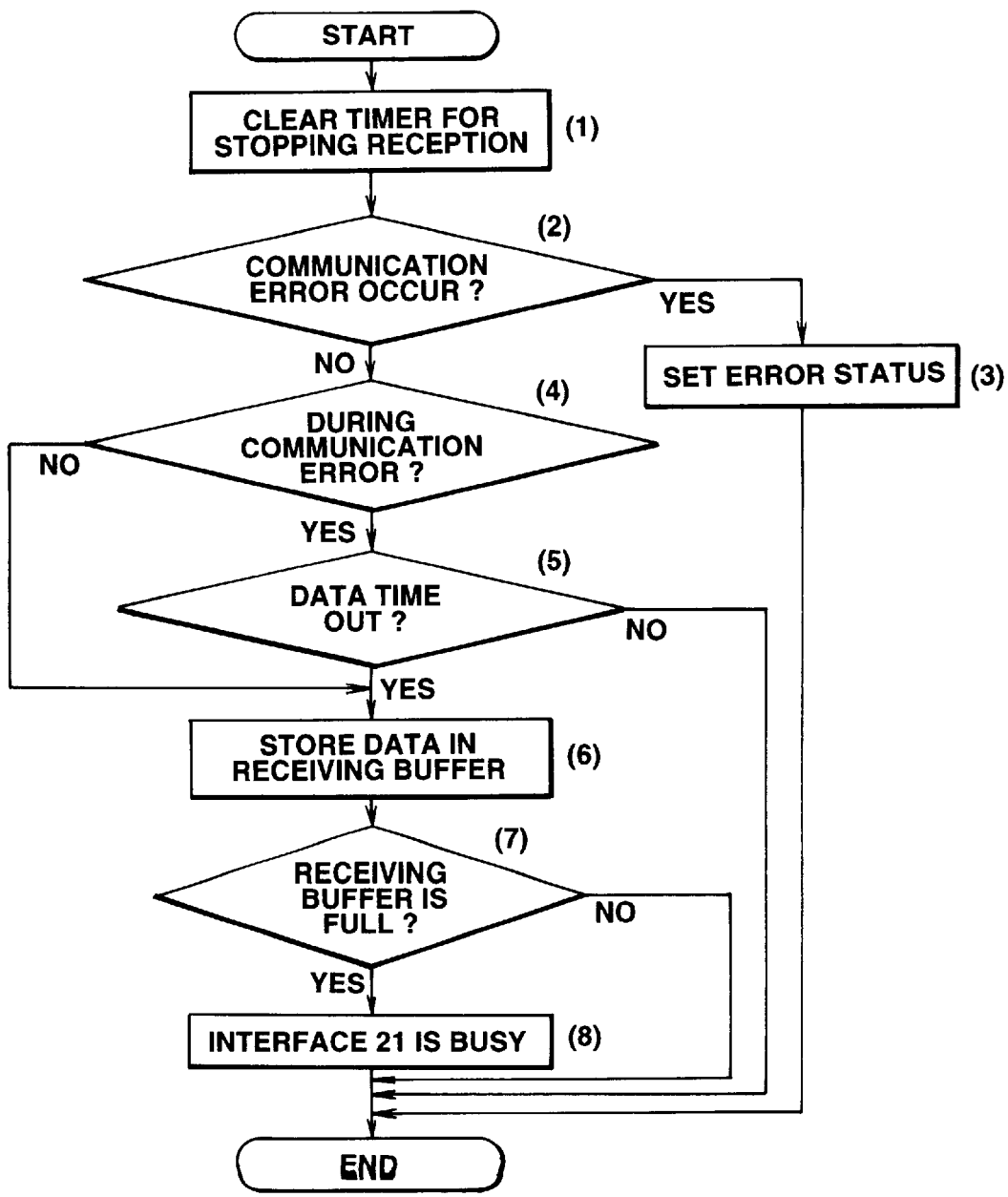
FIG. 16 is a flow chart showing a data interruption receiving process of a printing apparatus according to the sixth embodiment.

FIG. 16 is a flow chart showing a data interruption receiving process of a printing apparatus according to the sixth embodiment. (1)~(8) show each step.

The CPU 22a clears the timer for stopping reception 31 in step (1). The CPU 22a then determines whether a communication error has occurred.

If YES in step (2), the CPU 22a stores in step (3) information indicating that a communication error has occurred, in the memory for error status 29, and the process is finished. Due to this step, the information stored in the memory for time out shows that time out has not occurred.

If NO in step (2), the CPU 22a determines in step (4) whether the skipping data continues in accordance with the information stored in the error status memory 29. If YES in step (4), the CPU 22a determines whether the data time out has occurred in accordance with the information stored in the memory for data time out.

If NO in step (5), the process is finished.

If NO in step (4) or YES in step (5), the CPU 22a takes data from the interface 21 and stores it in the receiving buffer in RAM 22c in step (6).

In step (7), the CPU 22a determines whether the receiving buffer is full.

If YES is step (7), the CPU 22a executes a busy process in step (8) and the process is finished.

Figure 17:
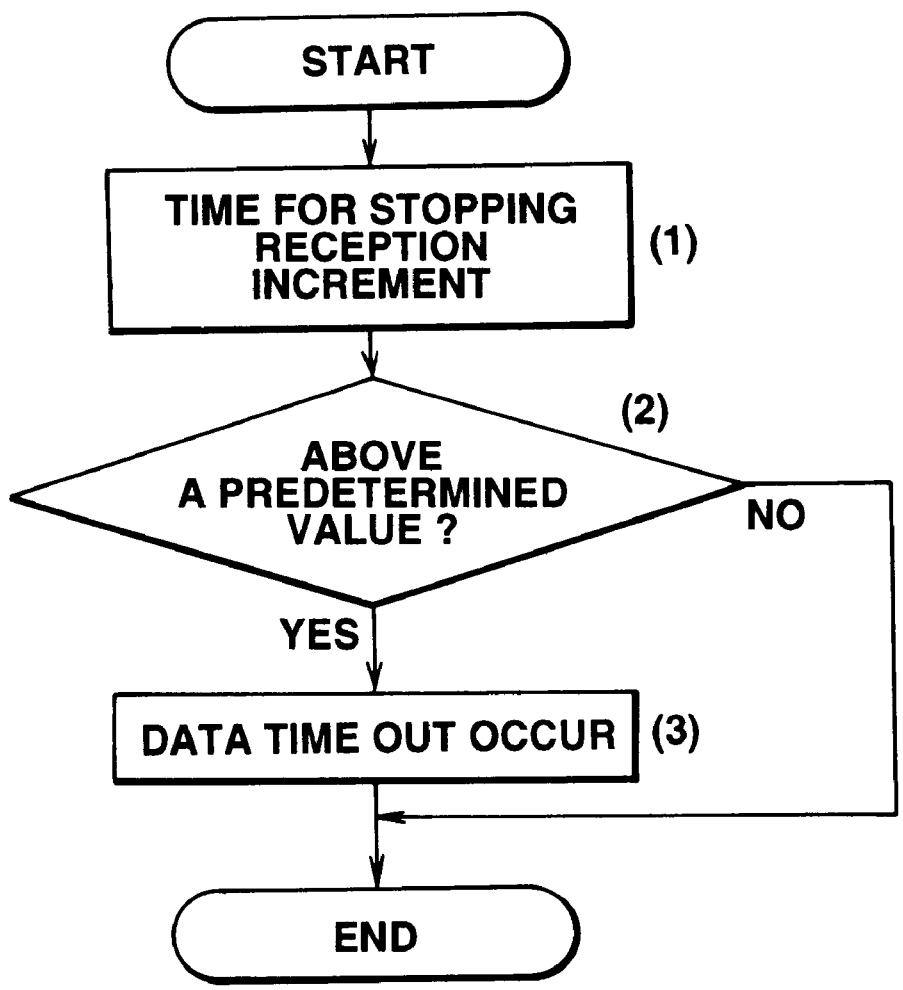
FIG. 17 is a flow chart showing an interruption process by a timer control of a printing apparatus according to the sixth embodiment.

FIG. 17 is a flow chart showing an interruption process by a timer control of a printing apparatus according to the sixth embodiment. (1)~(3) show each of the steps of the process.

In step (1), the timer for stopping reception 31 is incremented.

In step (2), the CPU 22a determines whether the value of the timer exceeds a predetermined value.

If YES in step (2), in step (3) the CPU 22a stores information indicating that a data time out has occurred and the process is finished.

It goes without saying that the CPU 22a executes reading processes from the receiving buffer, executes the data interpreting process, executes the storing process in the frame memory 24 and executes the printing process by the dot printer engine in accordance with the data from the host computer la apart from the interrupting process showed in FIGS. 16 and 17.

As mentioned above, the CPU 22a skips data from a beginning of the occurrence of the transferring error to before the occurrence of the data time out. Accordingly, the CPU 22a can omit a waste output.

The CPU 22a clears the time out information when the transferring error occurs in step (3) in FIG. 16.

The CPU 22a can clear the time out information at the end of skipping data regardless of the occurrence of the transferring error.

So the first embodiment can provide an output method and apparatus capable of assigning adequate amount of receiving buffer to each interface by controlling the size of receiving buffers in accordance with the condition of selected interfaces. As mentioned above the second embodiment can provide an output method and apparatus capable of selecting an effective interface for use by controlling to change from one interface to another in accordance with the result of monitoring the condition of the receiving buffers.

As mentioned above, the third embodiment can provide an output method and apparatus capable of selecting a usable interface by controlling to change from one interface to another in accordance with the result of detecting the end of data at each interface.

As mentioned above the fourth embodiment can provide an output method an apparatus capable of informing the condition of each interface by transferring a predetermined status signal through the two-way interface regardless of the condition of selecting interface.

As mentioned above, the fifth embodiment can provide and output method and apparatus capable of limiting the interface to carry out the process of error recovery in accordance with the condition of error occurring, while the selection of interface remains the same.

As mentioned above, the sixth embodiment can provide an output method and apparatus capable of restricting useless data processing after a transmitting error has occurred a few times by disregarding the data from the interface relating to an error until a time-out signal has occurred, by monitoring the condition of error occurring.

So these embodiments can execute efficiently the data receiving process with little amount of receiving buffer.

What is claimed is:

1. A printer control apparatus comprising:

a plurality of receiving means for receiving data from a plurality of external apparatuses and storing the respective received data;

selection means for selecting one of said plurality of receiving means; and control means for controlling a data storage capacity of said one of said plurality of receiving means selected by said selection means to be larger than a data storage capacity of another of said plurality of receiving mean; and second control means for controlling a data storage capacity of said one of said plurality of receiving means selected by said selection means to be larger than a data storage capacity of another of said plurality of receiving means.

2. An apparatus according to claim 1, wherein said control means increases the data storage capacity of said one of said plurality of receiving means selected by said selection means and decreases the data storage capacity of the another of said plurality of receiving means not selected by said selection means.

3. An apparatus according to claim 1, each of said plurality of receiving means comprising a port to receive data from the plurality of external apparatuses, and a receiving buffer to store the respective received data input simultaneously from the plurality of external apparatuses through said port.

4. A printer control apparatus comprising:

a plurality of receiving means for receiving data from a plurality of external apparatuses and storing the respective received data;

selection means for selecting one of said plurality of receiving means;

detection means for detecting an amount of data to be stored by said plurality of receiving means; and control means for controlling said selection means to select one of said plurality of receiving means based on the amount of data detected by said detection means.

5. An apparatus according to claim 4, said control means controlling said selection means to select one of said plurality of receiving means based on a frequency that the amount of data detected by said detection means reaches a predetermined amount.

6. An apparatus according to claim 5, said control means comprising counting means for counting a number of times the amount of data to be stored reaches the predetermined amount in each of said plurality of receiving means and said control means controlling said selection means to select one of said plurality of receiving means for which said counting means has a highest count of the number of times the amount of data reaches the predetermined amount.

7. An apparatus according to claim 6, said detection means measuring time when the amount of data to be stored in each of said plurality of receiving means has reached the predetermined amount, and detecting that the amount of data has reached the predetermined amount after a constant period has passed.

8. An apparatus according to claim 4, said selection means selecting one of said plurality of receiving means after the receiving means to be selected by said selection means becomes to be changed.

9. An apparatus according to claim 4, each of said plurality of receiving means comprising a port to input data from the plurality of external apparatuses, and a receiving buffer to store the received data input simultaneously from the plurality of external apparatuses through said port.

10. An apparatus according to claim 4, said control means registering one of said plurality of receiving means to be selected next based on the amount of data detected by said detection means, and said control means controlling said selection means to select the registered receiving means.

11. A printer control apparatus comprising:

a plurality of receiving means for receiving respective data from a plurality of external apparatuses and storing the received data;

selection means for selecting one of said plurality of receiving means;

judging means for judging whether a predetermined command is included in the data received by said one of said receiving means selected by said selection means; and control means for controlling said selection means to select said one of said plurality of receiving means when said judging means judges that the predetermined command is included in the data received by said plurality of receiving means.

12. An apparatus according to claim 11, said predetermined command being a form feed command and said control means controlling said selection means to select one of said plurality of receiving means when the form feed command is included in the data received by said receiving means.

13. An apparatus according to claim 11, said selection means selecting one of said plurality of receiving means after the one of said plurality of said receiving means becomes to be changed.

14. An apparatus according to claim 11, said control means registering the receiving means receiving data in which said judging means judges that the predetermined command is included and controlling said selection means to select the registered receiving means.

15. A printer control apparatus comprising:

a plurality of receiving means for receiving data from an external apparatus and storing the received data;

selection means for selecting one of said plurality of receiving means;

first control means for controlling a printer to print based on the data received by said one of said plurality of receiving means selected by said selection means;

second control means for performing processing based on the data received by each of said plurality of receiving means not selected by said selection means, the processing being performed independently from selection;

judging means for judging a kind of data received by one of said plurality of receiving means; and third control means for controlling whether one of printing based on said first control means is performed and processing based on said second control means is performed.

16. An apparatus according to claim 15, said judging means judging whether the data received by one of said plurality of receiving means not selected by said selection means is predetermined data, said third control means performing the processing based on said second control means when the received data is judged to be the predetermined data, and performs the processing based on said first control means when the received data is judged not to be the predetermined data.

17. An apparatus according to claim 15, said first control means waiting until one of said plurality of receiving means is selected by said selection means and performing the processing based on the received data when data is received by one of said plurality of receiving means not selected by said selection means.

18. An apparatus according to claim 15, said judging means judging whether the data received by one of said plurality of receiving means not selected by said selection means is a predetermined status request command, and said second control means performing a predetermined status response to the external apparatus when said judging means judges that the data received by the one of said plurality of receiving means not selected by said selection means is the predetermined status request command.

19. An apparatus according to claim 15, wherein said first control means analyzes the data received by the one of said plurality of receiving means selected by said selection means so as to generate bitmap data and outputs the generated bitmap data to the printer.

20. An apparatus according to claim 19, further comprising printing means for printing the generated bitmap data output by said first control means.

21. An apparatus according to claim 15, each of a plurality of receiving means comprises a port to receive data from an external apparatus, and a receiving buffer to store the data received from the external apparatus through the port.

22. A printer control method comprising the steps of:

receiving respective data from a plurality of external apparatuses by a printer having a plurality of receiving means;

storing the data received in said receiving step;

selecting one of the plurality of receiving means; and controlling data storage capacity of the one of the plurality of receiving means selected in said selecting step to be larger than data storage capacity of another of the plurality of receiving means.

23. A method according to claim 22, wherein said step of controlling data storage capacity comprises steps of increasing the data storage capacity of the one of the plurality of receiving means selected in said selecting step and decreasing the data storage capacity of the another of said plurality of receiving means not selected in said selecting step.

24. A method according to claim 22, wherein the data received in said receiving step is received at a port provided in each of the plurality of receiving means, and the respective received data stored in said storing step is stored in a receiving buffer provided in each of the plurality of receiving means.

25. A printer control method comprising the steps of:

receiving data from a plurality of external apparatuses by a printer having a plurality of receiving means;

storing the respective data received in said receiving step;

selecting one of the plurality of receiving means;

detecting an amount of data to be stored by the plurality of receiving means; and p1 controlling said selecting step to select one of the plurality of receiving means based on the amount of data detected in said detecting step.

26. A method according to claim 25, wherein said step of controlling said selecting step is based on a frequency that the amount of data detected in said detecting step reaches a predetermined amount.

27. A method according to claim 26, said step of controlling said selecting step comprising steps of counting a number of times the amount of data to be stored reaches the predetermined amount in each of the plurality of receiving means, and controlling the selecting step to select one of the plurality of receiving means for which said counting step counts a highest number of times the amount of data reaches the predetermined amount.

28. A method according to claim 27, wherein said detecting step detects the amount of the data to be stored by measuring time when the amount of data to be stored in each of the plurality of receiving means has reached the predetermined amount, and detects that the amount of data has reached the predetermined amount after a constant period has passed.

29. A method according to claim 25, said selecting step selecting one of the plurality of receiving means after the receiving means to be selected in said selecting step becomes to be changed.

30. A method according to claim 25, wherein the data received in said receiving step is received at a port provided in each of the plurality of receiving means, and the received data stored in said storing step is stored in a receiving buffer provided in each of the plurality of receiving means.

31. A method according to claim 25, said step of controlling said selecting step further comprising steps of registering one of the plurality of receiving means to be selected next based on the amount of data detected in said detecting step, and controlling said selecting step to select the registered receiving means.

32. A printer control method comprising the steps of:
receiving respective data from a plurality of external apparatuses by a printer having a plurality of receiving means;
storing the respective data received in said receiving step;
selecting one of the plurality of receiving means;
judging whether a predetermined command is included in the data received by the receiving means selected in said selecting step; and
controlling said selecting step to select one of the plurality of receiving means when said judging step judges that the predetermined command is included in the data received by the receiving means.

33. A method according to claim 32, said predetermined command being a form feed command and wherein said step of controlling said selecting step comprises controlling selection to select one of the plurality of receiving means when a form feed command, serving as the predetermined command, is included in the data received by the receiving means.

34. A method according to claim 32, said selecting step selecting one of the plurality of receiving means after the receiving means to be selected in said selecting step becomes to be changed.

35. A method according to claim 32, further comprising a step of detecting an amount of respective data from the plurality of external apparatuses,
said step of controlling said selecting step further comprising steps of registering one of the plurality of receiving means to be selected next based on the amount of data detected in said detecting step, and controlling said selecting step to select the registered receiving means.

36. A printer control method comprising the steps of:
receiving data from an external apparatus by a printer having a plurality of receiving means;
storing the data received in said receiving step;
selecting one of the plurality of receiving means;
controlling the printer to print based on the data received by the receiving means selected in said selecting step;
performing processing based on the data received by each of the plurality of receiving means not selected in said selecting step, said processing being performed independently from said selecting step;
judging a kind of data received by the receiving means selected in said selecting step; and
controlling whether one of said step of controlling the printer and said step of performing processing is performed.

37. A method according to claim 36, said judging step further comprising judging whether the data received by one of the plurality of receiving means not selected in said selecting step is predetermined data, wherein when said judging step judges that the received data is the predetermined data, said step of performing processing is performed, and when said judging step judges that the received data is not the predetermined data, said step of controlling the printer is performed.

38. A method according to claim 36, further comprising the step of waiting until one of the plurality of receiving means is selected in said selecting step, said step of performing the processing based on the received data being performed when data is received by one of the plurality of receiving means not selected in said selecting step.

39. A method according to claim 36, said judging step further comprising judging whether the data received by one of the plurality of receiving means not selected in said selecting step is a predetermined status request command, wherein when said judging step judges that the received data is the predetermined status request demand, said step of performing processing comprises sending a predetermined status response to the external apparatus.

40. A method according to claim 36, wherein said step of controlling the printer comprises steps of analyzing data received by the receiving means selected in said selecting step so as to generate bitmap data, and outputting the generated bitmap data to the printer.

41. A method according to claim 40, further comprising a step of printing the generated and output bitmap data.

42. A method according to claim 36, wherein the data received in said receiving step is received at a port provided in each of the plurality of receiving means, and the received data stored in said storing step is stored in a receiving buffer provided in each of the plurality of receiving means.

43. A memory medium storing computer-executable instructions for performing the steps of:
receiving respective data from a plurality of external apparatuses by a printer having a plurality of receiving means;
selecting one of the plurality of receiving means; and
controlling data storage capacity of the one of the plurality of receiving means selected in said selecting step to be larger than data storage capacity of another of the plurality of receiving means.

44. A memory medium storing computer-executable instructions according to claim 43, wherein said step of controlling data storage capacity comprises steps of increasing the data storage capacity of the one of the plurality of receiving means selected in said selecting step and decreasing the data storage capacity of the another of said plurality of receiving means not selected in said selecting step.

45. A memory medium storing computer-executable instructions for performing the steps of:
receiving respective data from a plurality of external apparatuses by a printer having a plurality of receiving means;
selecting one of the plurality of receiving means;
detecting an amount of data to be stored by the plurality of receiving means; and controlling said selecting step to select one of the plurality of receiving means based on the amount of data detected in said detecting step.

46. A memory medium storing computer-executable instructions according to claim 45, wherein said step of controlling said selecting step is based on a frequency that the amount of data detected in said detecting step reaches a predetermined amount.

47. A memory medium storing computer-executable instructions according to claim 46, said step of controlling said selecting step comprising steps of counting a number of times the amount of data to be stored reaches the predetermined amount in each of the plurality of receiving means, and controlling the selecting step to select one of the plurality of receiving means for which said counting step counts a highest number of times the amount of data reaches the predetermined amount.

48. A memory medium storing computer-executable instructions according to claim 47, wherein said detecting step detects the amount of the data to be stored by measuring time when the amount of data to be stored in each of the plurality of receiving means has reached the predetermined amount, and detects that the amount of data has reached the predetermined amount after a constant period has passed.

49. A memory medium storing computer-executable instructions according to claim 45, said selecting step selecting one of the plurality of receiving means after the receiving means to be selected in said selecting step becomes to be changed.

50. A memory medium storing computer-executable instructions according to claim 45, further comprising a step of storing the respective data received in said receiving step, wherein the respective data received in said receiving step is received at a port provided in each of the plurality of receiving means, and the received data stored in said storing step is stored in a receiving buffer provided in each of the plurality of receiving means.

51. A memory medium storing computer-executable instructions according to claim 45, said step of controlling said selecting step further comprising steps of registering one of the plurality of receiving means to be selected next based on the amount of data detected in said detecting step, and controlling said selecting step to select the registered receiving means.

52. A memory medium storing computer-executable instructions for performing the steps of:

receiving respective data from a plurality of external apparatuses by a printer having a plurality of receiving means;

selecting one of the plurality of receiving means;

judging whether a predetermined command is included in data received by the receiving means selected in said selecting step; and controlling said selecting step to select one of the plurality of receiving means when said judging step judges that the predetermined command is included in the data received by the receiving means.

53. A memory medium storing computer-executable instructions according to claim 52, said predetermined command being a form feed command and wherein said step of controlling said selecting step comprises controlling selection to select one of the plurality of receiving means when a form feed command, serving as the predetermined command, is included in the data received by the receiving means.

54. A memory medium storing computer-executable instructions according to claim 52, said selecting step selecting one of the plurality of receiving means after the receiving means to be selected in said selecting step becomes to be changed.

55. A memory medium storing computer-executable instructions according to claim 52, said step of controlling said selecting step further comprising steps of registering one of the plurality of receiving means to be selected next based on the amount of data detected in said detecting step, and controlling said selecting step to select the registered receiving means.

56. A memory medium storing computer-executable instructions for performing the steps of:

receiving data from an external apparatus by a printer having a plurality of receiving means;

storing the data received in said receiving step;

selecting one of the plurality of receiving means;

controlling the printer to print based on the data received by the receiving means selected in said selecting step;

performing processing based on the data received by each of the plurality of receiving means not selected in said selecting step, said processing being performed independently from said selecting step;

judging a kind of data received by the receiving means selected in said selecting step; and controlling whether one of said step of controlling the printer and said step of performing processing is performed.

57. A memory medium storing computer-executable instructions according to claim 56, said judging step further comprises judging whether the data received by one of the plurality of receiving means not selected in said selecting step is predetermined data, wherein when said judging step judges that the received data is the predetermined data, said step of performing processing is performed, and when said judging step judges that the received data is not the predetermined data, said step of controlling the printer is performed.

58. A memory medium storing computer-executable instructions according to claim 56, further comprising the step of waiting until one of the plurality of receiving means is selected in said selecting step, said step of performing the processing based on the received data being performed when data is received by one of the plurality of receiving means not selected in said selecting step.

59. A memory medium storing computer-executable instructions according to claim 56, said judging step further comprising judging whether the data received by one of the plurality of receiving means not selected in said selecting step is a predetermined status request command, wherein when said judging step judges that the received data is the predetermined status request command, said step of performing processing comprises sending a predetermined status response to the external apparatus.

60. A memory medium storing computer-executable instructions according to claim 56, wherein said step of controlling the printer comprises steps of analyzing data received by the receiving means selected in said selecting step so as to generate bitmap data, and outputting the generated bitmap data to the printer.

61. A memory medium storing computer-executable instructions according to claim 60, further comprising a step of printing the generated and output bitmap data.

62. A memory medium storing computer-executable instructions according to claim 56, wherein the data received in said receiving step is received at a port provided in each of the plurality of receiving means, and the received data stored in said storing step is stored in a receiving buffer provided in each of the plurality of receiving means.

63. An apparatus according to claim 1, wherein said selection means selects an interface through which first data is received.

64. An apparatus according to claim 11, wherein said judging means judges the end of data in accordance with the predetermined command.

65. A method according to claim 22, wherein said selecting step selects an interface through which first data is received.

66. A method according to claim 32, wherein said judging step judges the end of data in accordance with the predetermined command.

* * * * *

UNITED STATES PATENT AND TRADEMARK OFFICE
CERTIFICATE OF CORRECTION

PATENT NO. : 6,028,985
DATED : February 22, 2000
INVENTOR(S) : Hitoshi Okuyama

It is certified that error appears in the above-identified patent and that said Letters Patent is hereby corrected as shown below:

Column 7,
Line 49, "incremented" should read -- incremented. --

Column 9,
Line 35, "22aex-" should read -- 22a ex- --.

Column 12,
Line 9, "mean;" should read -- means. --
Lines 10 to 15, should be deleted in their entirety.

Column 14,
Line 53, "means; and p1 controlling said selecting" should read -- means; and controlling said selecting --.

Column 20,
Line 7, insert -- 67. A printer control apparatus comprising:
    a plurality of receiving means receiving respective data from a plurality of external apparatuses and storing the respective received data;
    selection means selecting one of said plurality of receiving means;
    reading means reading data received by said receiving means;
    judging means judging whether a predetermined command is included in the read data; and
    control means controlling said selection means in accordance with a result of said judging means.

68. A printer control apparatus according to claim 67, wherein said control means judges whether said receiving means can be changed when said judging means judges that the predetermined command is included in the data received by said receiving means, and said control means controls said selection means to select one of said plurality of receiving means when the receiving means can be changed.

69. A printer control apparatus according to claim 67, wherein said selection means selects one of said plurality of receiving means after the one of said plurality of said receiving means is changed.

UNITED STATES PATENT AND TRADEMARK OFFICE
CERTIFICATE OF CORRECTION

PATENT NO. : 6,028,985
DATED : February 22, 2000
INVENTOR(S) : Hitoshi Okuyama

It is certified that error appears in the above-identified patent and that said Letters Patent is hereby corrected as shown below:

70. A printer control apparatus according to claim 67, wherein said predetermined command is a form feed command and said control means controls said selection means to select one of said plurality of receiving means when the form feed command is included in the data received by said receiving means.

71. A printer control apparatus according to claim 67, wherein said control means registers said receiving means receiving data in which said judging means judges that the predetermined command is included and controls said selection means to select the registered receiving means.

72. A method of controlling a printer apparatus comprising the steps of:
receiving, in a plurality of receiving means, respective data from a plurality of external apparatuses and storing the respective received data;
reading the data received in said receiving step;
selecting one of the plurality of receiving means receiving data in said receiving step;
judging whether a predetermined command is included in the read data read in said reading step; and
controlling the selection in said selecting step in accordance with a result of a judgement made in said judging step.

73. The method of controlling a printer apparatus of claim 72, further comprising the step of judging in said judging step whether the receiving means can be changed when it is judged that the predetermined command is included in the data received in said receiving step, and controlling in said controlling step in the selection in said selecting step of one of the plurality of receiving means when the receiving means can be changed.

74. The method of controlling a printer apparatus of claim 72, further comprising the step of selecting in said selecting step one of the plurality of receiving means after one of the plurality of receiving means is changed.

75. The method of controlling a printer apparatus of claim 72, wherein the predetermined command is a form feed command and said controlling step controls the selection in said selecting step of one of the plurality of receiving means when the form feed command is included in the data received in said receiving step.

UNITED STATES PATENT AND TRADEMARK OFFICE
CERTIFICATE OF CORRECTION

PATENT NO. : 6,028,985
DATED : February 22, 2000
INVENTOR(S) : Hitoshi Okuyama

It is certified that error appears in the above-identified patent and that said Letters Patent is hereby corrected as shown below:

76. The method of controlling a printer apparatus of claim 72, further comprising the step of registering the receiving means receiving data judged in said judging step to include the predetermined command, and controlling in said controlling step the selection in said selecting step of the registered receiving means. --

Signed and Sealed this

Fifteenth Day of January, 2002

Attest:

Attesting Officer

JAMES E. ROGAN
Director of the United States Patent and Trademark Office